(12) United States Patent
Nair et al.

(10) Patent No.: US 12,217,143 B1
(45) Date of Patent: Feb. 4, 2025

(54) RESOLVING OPAQUENESS OF COMPLEX MACHINE LEARNING APPLICATIONS

(71) Applicant: Wells Fargo Bank, N.A., San Francisco, CA (US)

(72) Inventors: Vijayan N. Nair, Matthews, NC (US); Agus Sudjianto, Charlotte, NC (US); Jie Chen, Fremont, CA (US); Kurt Schieding, Charlotte, NC (US); Linwei Hu, Charlotte, NC (US); Xiaoyu Liu, Newark, CA (US); Joel Vaughan, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 1126 days.

(21) Appl. No.: 16/293,252

(22) Filed: Mar. 5, 2019

Related U.S. Application Data

(63) Continuation-in-part of application No. 16/179,073, filed on Nov. 2, 2018, now Pat. No. 11,550,970.

(51) Int. Cl.
| | | |
|---|---|---|
| G06N 20/20 | (2019.01) | |
| G06F 16/901 | (2019.01) | |
| G06F 17/13 | (2006.01) | |
| G06F 17/15 | (2006.01) | |
| G06F 18/23213 | (2023.01) | |
| G06N 3/047 | (2023.01) | |
| G06N 3/048 | (2023.01) | |
| G06T 11/20 | (2006.01) | |

(52) U.S. Cl.
CPC ......... *G06N 20/20* (2019.01); *G06F 16/9027* (2019.01); *G06F 17/13* (2013.01); *G06F 17/15* (2013.01); *G06F 18/23213* (2023.01); *G06N 3/047* (2023.01); *G06N 3/048* (2023.01); *G06T 11/206* (2013.01)

(58) Field of Classification Search
CPC .. G06F 30/20; G06F 16/2246; G06F 16/2272; G06F 2111/10; G06F 16/9027; G06F 16/285; G06N 20/00; G06N 3/08; G06N 5/045
See application file for complete search history.

(56) References Cited

U.S. PATENT DOCUMENTS

| | | | | |
|---|---|---|---|---|
| 2017/0364803 | A1* | 12/2017 | Calmon | G06N 3/0454 |
| 2018/0018553 | A1* | 1/2018 | Bach | G06N 3/02 |
| 2018/0018590 | A1* | 1/2018 | Szeto | G16H 50/20 |
| 2018/0158552 | A1* | 6/2018 | Liu | G06N 3/0445 |

(Continued)

OTHER PUBLICATIONS

Ribeiro, Marco & Singh, Sameer & Guestrin, Carlos. (2016). "Why Should I Trust You?": Explaining the Predictions of Any Classifier. 97-101. 10.18653/v1/N16-3020. (Year: 2016).*

(Continued)

*Primary Examiner* — Kakali Chaki
*Assistant Examiner* — Michael H Hoang
(74) *Attorney, Agent, or Firm* — K&L Gates LLP

(57) ABSTRACT

Computing systems and technical methods that transform data structures and pierce opacity difficulties associated with complex machine learning algorithms are disclosed. Advances include a framework and techniques that include: i) global diagnostics; ii) locally interpretable models LIME-SUP-R and LIME-SUP-D; and iii) explainable neural networks.

19 Claims, 29 Drawing Sheets
(24 of 29 Drawing Sheet(s) Filed in Color)

(56) References Cited

U.S. PATENT DOCUMENTS

2019/0156216 A1* 5/2019 Gupta .................... G06N 20/00
2021/0358579 A1* 11/2021 Chen ..................... G06N 5/045

OTHER PUBLICATIONS

Zhang, Li & Xiang, Tao & Gong, Shaogang. (2016). Learning a Deep Embedding Model for Zero-Shot Learning. (Year: 2016).*

Hall, P., Kurka, M., and Bartz, A. (Jan. 2018). Using H2O Driverless AI. http://docs.h2o.ai (Year: 2018).*

Goldstein, Alex & Kapelner, Adam & Bleich, Justin & Pitkin, Emil. (2013). Peeking Inside the Black Box: Visualizing Statistical Learning With Plots of Individual Conditional Expectation. Journal of Computational and Graphical Statistics. 24. 10.1080/10618600. 2014.907095. (Year: 2013).*

Tamagnini, Paolo, et al. "Interpreting black-box classifiers using instance-level visual explanations." Proceedings of the 2nd workshop on human-in-the-loop data analytics. 2017. https://dl.acm.org/doi/pdf/10.1145/3077257.3077260 (Year: 2017).*

Samek, Wojciech, Thomas Wiegand, and Klaus-Robert Müller. "Explainable artificial intelligence: Understanding, visualizing and interpreting deep learning models." arXiv preprint arXiv:1708. 08296 (2017). https://arxiv.org/pdf/1708.08296.pdf (Year: 2017).*

Dam, Hoa Khanh, Truyen Tran, and Aditya Ghose. "Explainable software analytics." Proceedings of the 40th International Conference on Software Engineering: New Ideas and Emerging Results. 2018. https://dl.acm.org/doi/pdf/10.1145/3183399.3183424 (Year: 2018).*

Apley, Daniel W., and Jingyu Zhu. "Visualizing the effects of predictor variables in black box supervised learning models." arXiv preprint arXiv: 1612.08468 (2016). (Year: 2016).*

Ruan, Lingyan, and Ming Yuan. "Dimension reduction and parameter estimation for additive index models." Statistics and its Interface 3.4 (2010): 493-499. https://www.intlpress.com/site/pub/files/_fulltext/journals/sii/2010/0003/0004/SII-2010-0003-0004-a007.pdf (Year: 2010).*

Furlanello T, Lipton Z, Tschannen M, Itti L, Anandkumar A. Born again neural networks. InInternational Conference on Machine Learning Jul. 3, 2018 (pp. 1607-1616). PMLR. http://proceedings.mlr.press/v80/furlanello18a/furlanello18a.pdf (Year: 2018).*

Tan, S., Caruana, R., Hooker, G., and Gordo, A. Transparent model distillation. arXiv: 1801.08640, 2018. https://arxiv.org/pdf/1801. 08640v1.pdf (Year: 2018).*

Hu et al., "Locally Interpretable Models and Effects based on Supervised Partitioning (LIME-SUP)", Available Online at <https://arxiv.org/ftp/arxiv/papers/1806/1806.00663.pdf>, Jun. 1, 2018, pp. 1-15.

* cited by examiner

For Clarity of Axis Labels, see FIG. 12B

For Clarity of Axis Labels, see FIG. 13B

RESOLVING OPAQUENESS OF COMPLEX MACHINE LEARNING APPLICATIONS

CROSS-REFERENCE TO RELATED APPLICATIONS

This application is a continuation-in part of U.S. Non-Provisional patent application Ser. No. 16/179,073 entitled "RESOLVING OPAQUENESS OF COMPLEX MACHINE LEARNING APPLICATIONS" filed on Nov. 2, 2018. The entirety of the above-noted application is incorporated by reference herein.

BACKGROUND

Computer systems are often analogized to biologic systems. Even the World Wide Web is taken from the biological analogy of a spider connecting different points together with its gossamer web. Innovation has striven to create artificial intelligence, and analogized that intelligence to a human brain. Machine learning has been called an application of artificial intelligence that provides an electronic computing system the ability to automatically learn and improve from experience without being explicitly programmed. Thus, the term "application" is used in a context to indicate that the innovation is directed to more than math, but to a technical application that provides improved computing systems. Aside from any such use of literary analogies, computing systems are not biologic (or living) and are not living in the sense that humans are. Computing systems are not abstract, but are real—and deal with real machines and systems. Machine learning concerns computing solely in a technical environment to which problem situations are structured through models. The data structures associated with machine learning are distinct from the manner in which a human thinks, and the processing of data structures associated with machine learning is not an exercise in abstract thinking, nor divorceable from the technical environment.

Further, and often, machine learning systems must deal with data at volumes and speeds that the term "mere automation" does not apply in the sense that a machine is merely doing that which a human may do (this is commonly referred to as "Big Data"). As Big Data has become more usual in technical efforts, traditional techniques that may seek to apply simple statistical methods have encountered limitations in the art. Machine learning applications provide some means to overcome limitations with flexibility of modeling and creating data structures to reflect that modeling. It is to be appreciated that improvements in analysis, predictive performance, augmented feature engineering of technical systems may be advanced with fast and efficient machine learning techniques. Not only has machine learning applications proliferated, the complexity of machine learning applications also proliferates, creating issues with input to output traceability. The growing complexity and difficulty to understand, follow, or interpret the computing results leads to an opaqueness associated with such technical tools. The framework and techniques of the present innovation disclosed in this application aim at resolving or alleviating the opaqueness issue. The technical reality does not limit the usefulness of referring to computing systems with anthropic terms, especially discussing systems involved with machine learning and improvements to machine learning systems which may include (but not be limited to) actions that computers may long been incident to, such as the individual elements that courts have indicated to be abstract ideas. Ordered combinations of individual elements provide innovation that merits patent protection. In that light, even though machines and systems of machines, and critically, innovations concerned with machines and systems of machines are often much more easily grasped and understood when anthropic terms are used, terms like "learning," "predicting," "determining" and the like are to be understood in their technical sense in this application.

SUMMARY

The following presents a simplified summary in order to provide a basic understanding of some aspects of the innovation. This summary is not an extensive overview of the innovation. It is not intended to identify key/critical elements or to delineate the scope of the innovation. Its sole purpose is to present some concepts of the innovation in a simplified form as a prelude to the more detailed description that is presented later.

It is to be appreciated that piercing the opacity of complex machine learning applications is an issue entirely within a technical computing environment. Merely automating attempts to pierce opacity that may exist either by hand or by pencil and paper are not possible. No consistent systematic manner of doing this exists, so even the "mere automating" of these tasks may have been considered unapproachable outside of a technical computing environment. With this innovation, augmentation beyond mere automation includes creating components for a system whose functionality is currently not captured in most any manual process. In an embodiment, a computing system that pierces a black box effect of a complex machine learning application (or module) may be comprised of a replicator module, a translator module and a graphical user interface. The replicator module may employ local and/or global effect modeling on a plurality of machine learning modules that include at least one complex machine learning module. The local and/or global effect modeling communicates with a library of interpretable machine learning modules to create a replicated semi-additive index data structure. The translator module may generate explanatory mapping of inputs to the plurality of machine learning modules to results of the plurality of machine learning modules that include the black box effect of the at least one complex machine learning module. The graphical user interface may render selected characteristics of the data structure related to the explanatory mapping.

In another embodiment, a non-transitory computer-readable medium configured to store instructions, that when executed by a processor, perform operations including one or more of the system and method steps.

To accomplish the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
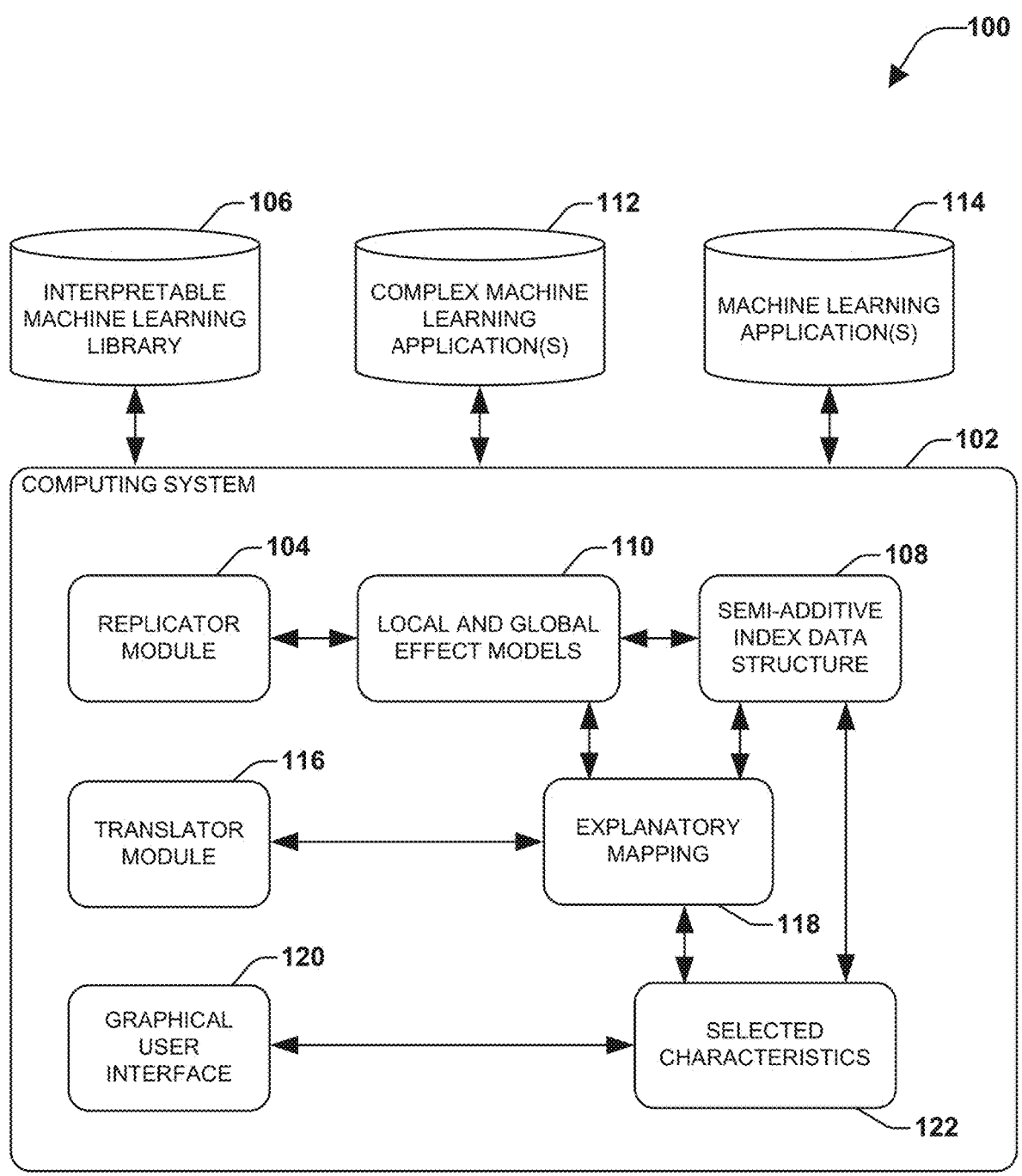
FIG. 1 is an illustration of an example system that resolves opaqueness of complex machine learning applications in context with one or more aspects of the disclosure.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details.

While specific characteristics are described herein, it is to be understood that the features, functions and benefits of the innovation can employ characteristics that vary from those described herein. These alternatives are to be included within the scope of the innovation and claims appended hereto.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, the claimed subject matter can be implemented as a method, apparatus, or article of manufacture using programming or engineering techniques to produce software, firmware, hardware, or any combination thereof to control a computer to implement the disclosed subject matter. The term "article of manufacture" as used herein is intended to encompass a computer program accessible from most any computer-readable device, carrier, or media. It is appreciated that embodiments are presented as a specific, non-limiting, examples of the innovation. Other embodiments are contemplated as well and intended to be included within the scope of this disclosure and claims appended hereto.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The disclosed innovation is contemplated to be provided in other implementations (for example, as a dedicated hardware Application-Specific Integrated Circuit "ASICs"), although not shown.

With reference now to the figures, FIG. 1, illustrated is a system 100 that indicates a technical context in which the innovation is placed. Technical context is also disclosed in relation to FIGS. 4 and 5, which will be discussed later. System 100 may comprise a computing system 102. It is to be appreciated that computing system 102 may be connected to a network (not shown) or otherwise connecting to other computing systems (not shown). It is to be appreciated that such connections are not shown in order to simplify the disclosure of the innovation. Computing system 102 may include a replicator module 104. Replicator module 104 may communicate with a library of interpretable machine learning modules 106 (also discussed as interpretable machine learning library 106) comprising a plurality of modules or models in order to create a replicated semi-additive index data structure 108, as will be discussed herein.

It is to be appreciated that some embodiments may refer to the created structure as an additive index data structures for simplicity, but the data structures created by the innovation perform in situations wherein a pure additive index data structure may not perform, and thus should be considered semi-additive even when referred to in simpler terms. Replicator module 104 may employs local and/or global effect modeling or models 110 (as will be discussed later) on a plurality of machine learning modules 112/114. It is to be appreciated that the plurality of machine learning modules 112/114 may comprise at least one of a complex machine learning application 112 and a plurality of machine learning applications 114.

It is further to be appreciated that complex machine learning applications, as is known in the art, have undesirable black box effects, also known as opacity issues. These black box effects can and often do create technical issues in the application of machine learning when being used to solve technical problems. With Big Data, computing can no longer be considered "just using a machine" and opacity issues may become critical. While machine learning advances have accelerated innovation in computing systems, opacity remains a technical issue inhibiting technical improvements from being deployed. As will be discussed later, local and global effect modeling 110, by replicator module 104, may employ at least an integrated approach of Locally Interpretable Models and Effects based on Supervised Partitioning (fitted response) "LIME-SUP-R" and Locally Interpretable Models and Effects based on Supervised Partitioning (derivatives of fitted response) "LIME-SUP-D" (not shown). As discussed herein, replicator module 104 replicates complex machine learning applications, but does so in a manner that is agnostic to the complex machine learning applications, thereby piercing opacity and alleviating black box effects.

Computing system 102 may also include a translator module 116. Translator module 116 may generate explanatory mapping 118 of inputs to the plurality of machine learning modules (or applications) 112/114 to a plurality of results of the plurality of machine learning modules (or applications) 112/114 that include the black box effect of the at least one complex machine learning module 112. Embodiments of translator module 116 will be discussed herein. Computing system 102 may also include a graphical user interface 120. Graphical user interface 120 may render selected characteristics 122 of a data structure related to an explanatory mapping 118. It is to be appreciated that a replicated semi-additive index data structure may comprise at least transformed data structures related to the library of interpretable machine learning modules 106.

Computing system 102, in an embodiment, may have translator module 116 generate a score. The generated score may indicate a match status to an at least one complex machine learning module 112 that may present an opacity concern or black box effect. As will be discussed herein, embodiments of the innovation may use a generated score to rank disparity, and may generate such based at least in part on prime and derivative results of a replicated semi-additive index data structure. In embodiments, a computing system 102 may render the generated score rendered by a graphical user interface, such as graphical user interface 120. In an embodiment, a rendered generated score identifies at least a complex machine learning module, such as complex machine learning module 112.

In embodiments, graphical user interface 120 may render at least a subset of visual representations of a data structure 108 related to an explanatory mapping 118. As will be discussed herein, at least a subset of visual representations may comprise at least one of an accumulated total derivative effects "ATDEV" plot and a heat map.

It is to be appreciated that piercing the opacity of complex machine learning applications is an issue entirely within a technical computing environment. Merely automating attempts to pierce opacity that may exist either by hand or by pencil and paper are not possible. No consistent systematic manner of doing this exists, so even the "mere automating" of these tasks may have been considered unapproachable outside of a technical computing environment. With this innovation, augmentation beyond mere automation, or functionality of a 'general purpose computer,' includes creating components for a system whose functionality is currently not captured in any manual process.

In an aspect, the disclosed innovation provides as output a configured data structure that provides replication of complex machine learning applications and also provides interpretability unmatched by the prior art. It is to be appreciated that the term "fitting" may be used interchangeably with "providing replication."

As may be common in Big Data or machine learning applications, various inputs (and input structures) may exhibit characteristics of sparsity and high cardinality, which may limit the usefulness of a subset of methodologies and algorithms. The present innovation, through the use of the various components, augments and provides replication with machine learning that is not limited by such concerns and provide substantially more than past methodologies. Additionally, another area in which the components working together can be differentiated from "mere automation" (and from the functionality of a 'general purpose computer') is in the resolution that compensates for e issues such as multicollinearity. It is to be appreciated that the disclosed innovation increases the efficacy of a transformed resultant structure.

Figure 2:
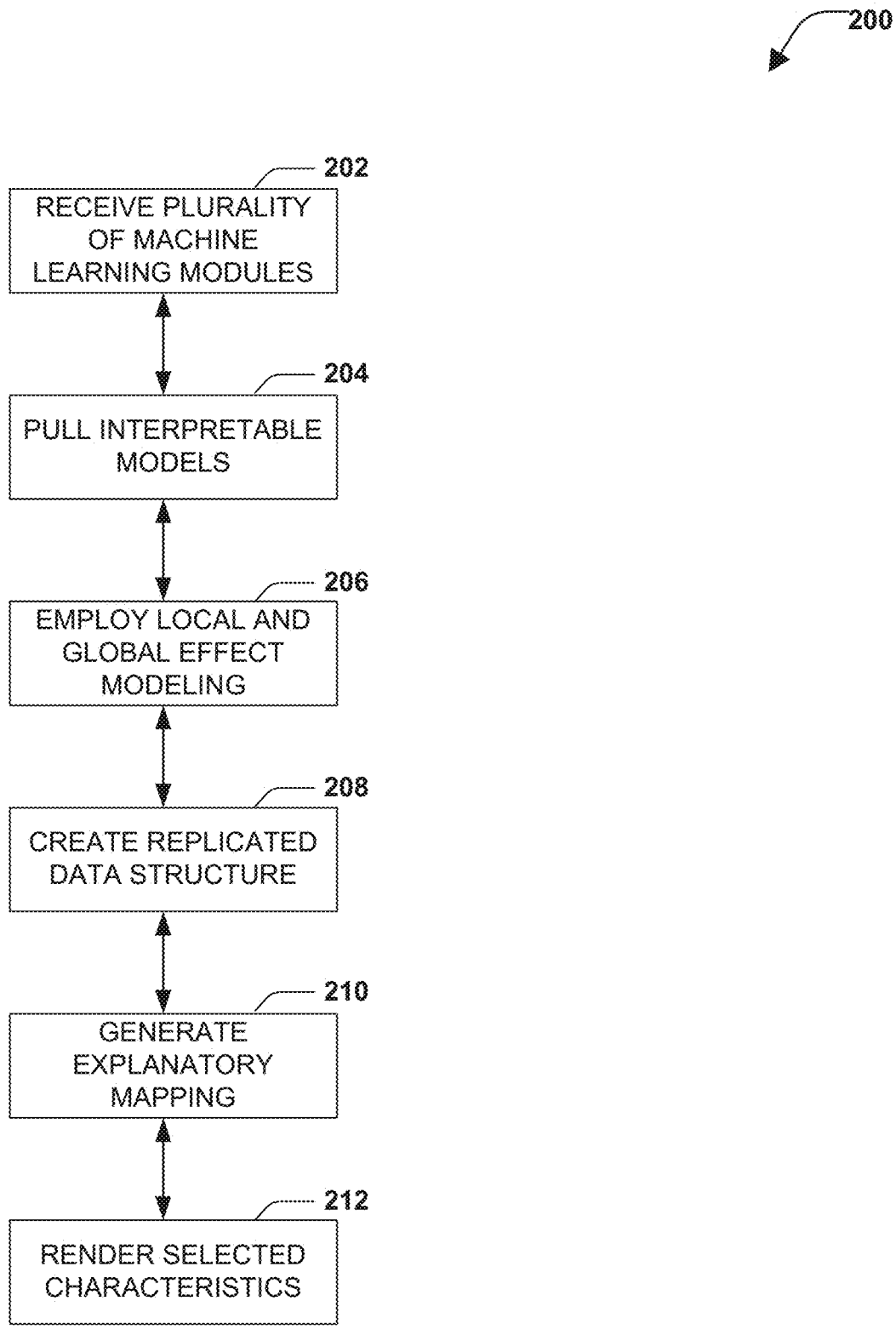
FIG. 2 illustrates an embodiment of a method that resolves opaqueness of complex machine learning applications according to one or more aspects of the disclosure.

Turning now to FIG. 2, illustrated is an example method 200 according to one or more embodiments. It is to be appreciated that details of additional embodiments discussed herein may employ an ordered combination of the steps of example method 200.

At 202, a computing system, such as for example computing system 102 of system 100 may receive a plurality of machine learning modules. It is to be appreciated that the innovation is able to handle a plurality of machine learning applications and that the plurality contains at least one complex machine learning application. Complex machine learning application(s) may be applications developed within computing system 102 or may be third party complex machine learning applications. In some embodiments, the plurality of machine learning applications may comprise a multitude of either or both machine learning applications and complex machine learning applications. In addition to the description herein, those skilled in the art are able to differentiate between a common machine learning application and a 'complex' machine learning application. At step 204 interpretable models are received. These models may be received from an interpretable machine library such as interpretable machine library 106 of system 100, for example. It is to be appreciated that either or receiving or pulling and receiving are contemplated at this step. At 206 local and/or global effect modeling may be employed. Embodiments of this step are reflected in the details discussed herein.

At step 208, creating a replicated data structure is contemplated. This may be completed by a replicator module, for example replicator module 104 of computing system 102. Additional detailed embodiments are discussed herein. At step 210, generating an explanatory mapping may be undertaken. In an embodiment, a translator module, such as for example translator module 116 of computing system 102 may generate an explanatory mapping. Additional embodiments of this step are reflected in the details discussed herein.

Step 212 may render selected characteristics. It is to be appreciated that rendering selected characteristics may be undertaken by a graphical user interface configured as disclosed herein, and may be for example, graphical user interface 120 of computing system 102. It is to be appreciated that while conventional graphical interfaces may provide their conventional capabilities, the innovation here, as an ordered combination, and as configured as disclosed, provides substantially more than conventional computing elements taken individually.

Figure 3:
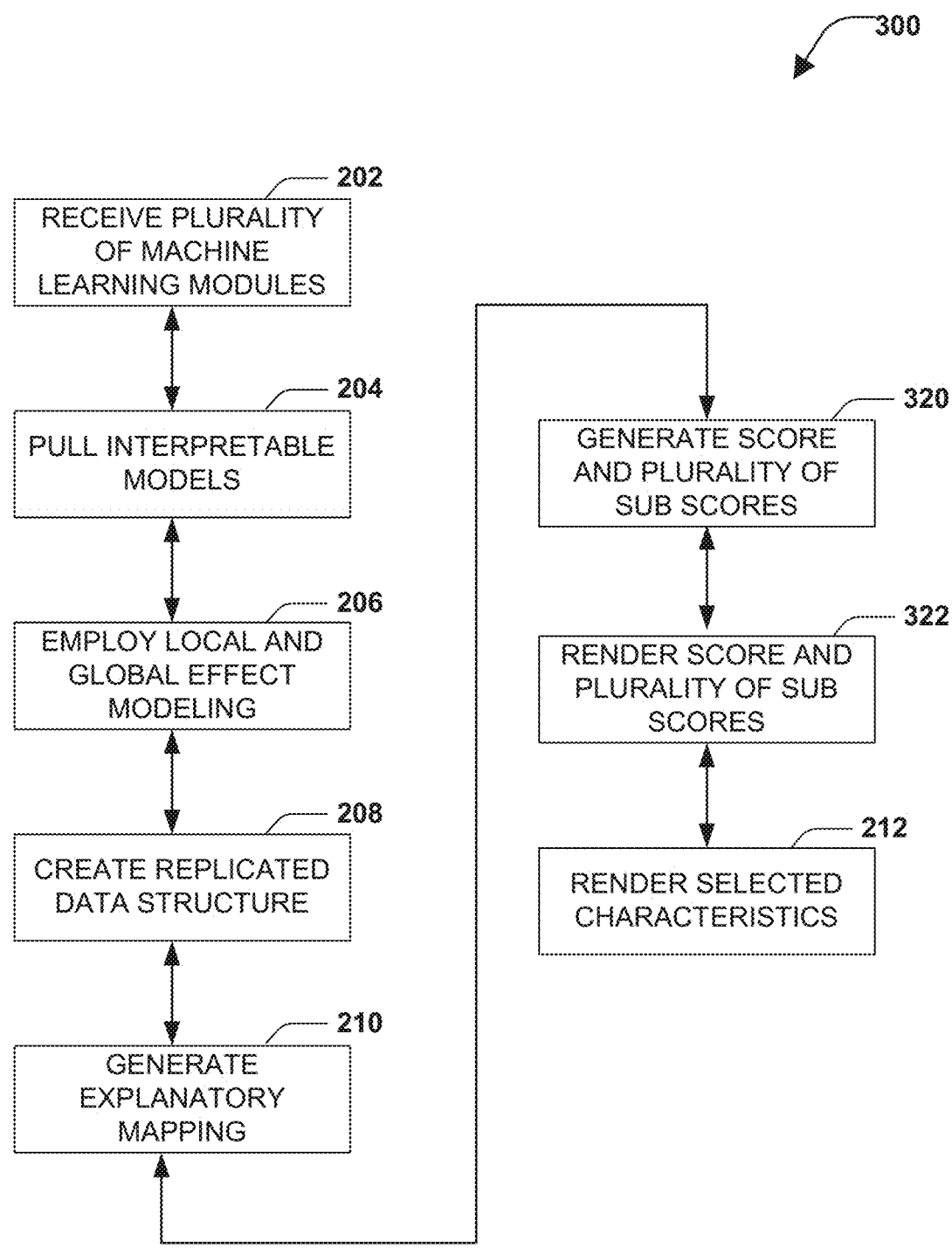
FIG. 3 illustrates an embodiment of a method that resolves opaqueness of complex machine learning applications according to one or more embodiments.

Turning now to FIG. 3, illustrated is an example method 300 according to one or more embodiments. It is to be appreciated that details of additional embodiments discussed herein may employ an ordered combination of the steps of example method 300.

At 202, a computing system, such as for example computing system 102 of system 100 may receive a plurality of machine learning modules. It is to be appreciated that the innovation is able to handle a plurality of machine learning applications and that the plurality contains at least one complex machine learning application. Complex machine learning application(s) may be applications developed within computing system 102 or may be third party complex machine learning applications. In some embodiments, the plurality of machine learning applications may comprise a multitude of either or both machine learning applications and complex machine learning applications. At step 204 interpretable models are received. These models may be received from an interpretable machine library such as interpretable machine library 106 of system 100, for example. It is to be appreciated that either or receiving or pulling and receiving are contemplated at this step. At 206 local and/or global effect modeling may be employed. Embodiments of this step are reflected in the details discussed herein.

At step 208, creating a replicated data structure is contemplated. This may be completed by a replicator module, for example replicator module 104 of computing system 102. Additional detailed embodiments are discussed herein. At step 210, generating an explanatory mapping may be undertaken. In an embodiment, a translator module, such as for example translator module 116 of computing system 102 may generate an explanatory mapping. Additional embodiments of this step are reflected in the details discussed herein.

In some embodiments, generating a score and a plurality of sub scores may occur at step 320. In embodiments, generating a score may be performed by a translator module, for example, translator module 116 of computing system 102. A score may indicate match status to at least one complex machine learning module (or application). A score may rank disparity based at least in part on prime and derivative results of a replicated semi-additive index data structure. Additional details related to such embodiments are disclosed herein.

Additionally in some embodiments, step 320 may include associating and at least one complex machine learning module (application) with a generated score. It is to be appreciated that generating a plurality of sub scores may involve, for a plurality of elements of a replicated semi-additive index date structure (for example semi-additive index data structure 108 of computing system 102), ranking of relative effects of a disparity to the plurality of elements of such a structure.

At step 322, rendering score and plurality of sub scores may occur. It is to be appreciated that some embodiments may include rendering one, the other or both scores and plurality of sub scores. Rendering may be undertaken by a graphical user interface, such as graphical user interface 120 of computing system 102, as disclosed herein.

Step 212 may render selected characteristics. It is to be appreciated that rendering selected characteristics may be undertaken by a graphical user interface configured as disclosed herein, and may be for example, graphical user interface 120 of computing system 102. It is to be appreciated that while conventional graphical interfaces may provide their conventional capabilities, the innovation here, as an ordered combination, and as configured as disclosed, provides substantially more than conventional computing elements taken individually.

While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Figure 4:
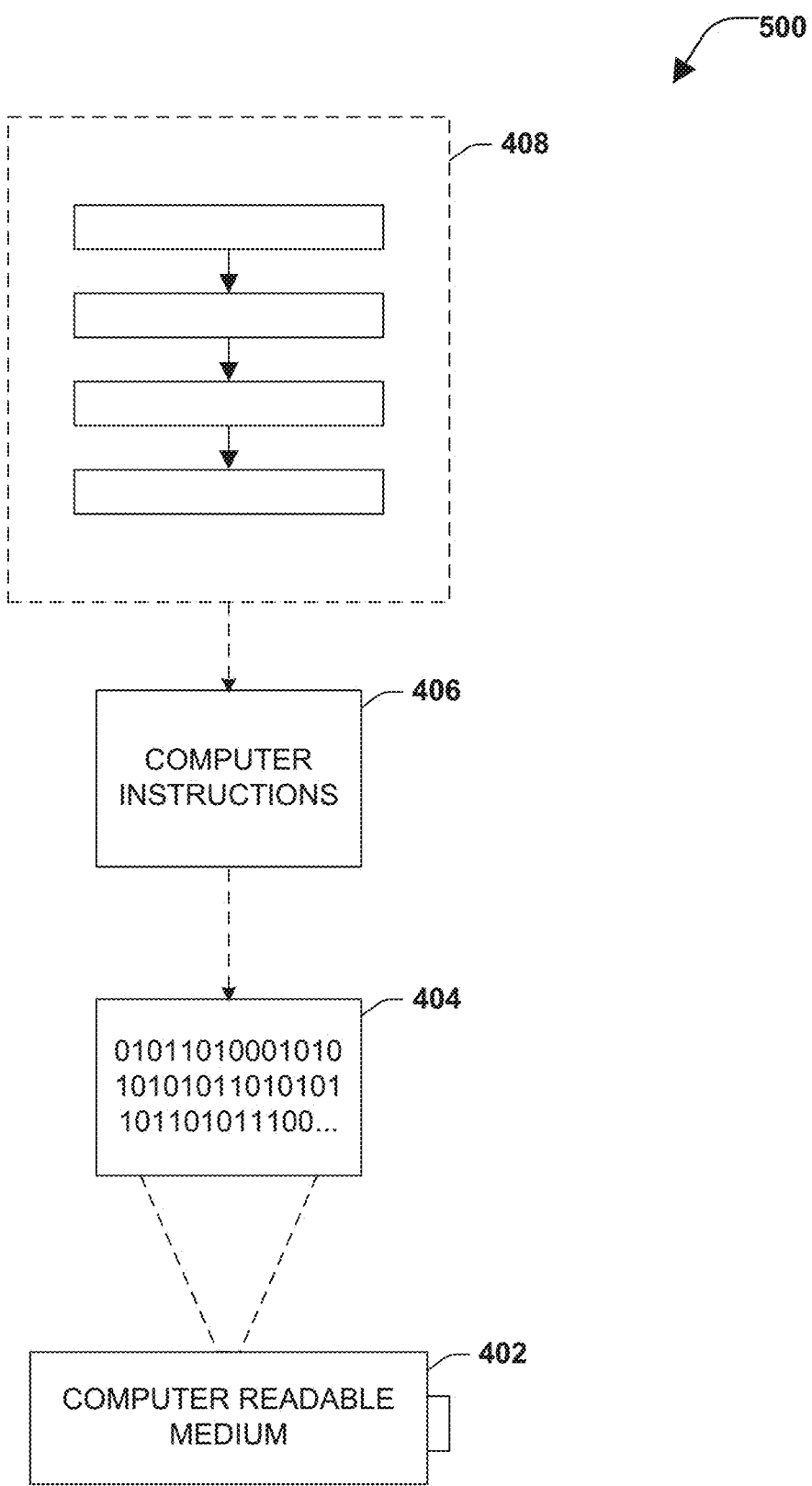
FIG. 4 is an illustration of an example computing environment where one or more of the provisions set forth herein can be implemented, according to one or more embodiments.

Still another embodiment involves a computer-readable medium including processor-executable instructions configured to implement one or more embodiments of the techniques presented herein. An embodiment of a computer-readable medium or a computer-readable device devised in these ways is illustrated in FIG. 4, wherein an implementation 400 includes a computer-readable medium 402, such as a readable compact disc (CD-R), Digital Versatile Disk (DVD-R), flash drive, a platter of a hard disk drive, etc., on which is encoded computer-readable data 404. This computer-readable data 404, such as binary data including a plurality of zero's and one's as shown in 404, in turn includes a set of computer instructions 406 configured to operate according to one or more of the principles set forth herein. In one such embodiment 400, the processor-executable computer instructions 406 may be configured to perform a method, such as the method 200 of FIG. 2 or method 300 of FIG. 3. In another embodiment, the processor-executable instructions 406 may be configured to implement a system, such as the system 420 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or most any combination thereof to control a computer to implement the disclosed subject matter. The term "article of manufacture" as used herein is intended to encompass a computer program accessible from most any computer-readable device, carrier, or media. The disclosed innovation is contemplated to be provided in other implementations (for example, as a dedicated hardware ASICS). Of course, many modifications may be made to this configuration without departing from the scope or spirit of the claimed subject matter.

Figure 5:
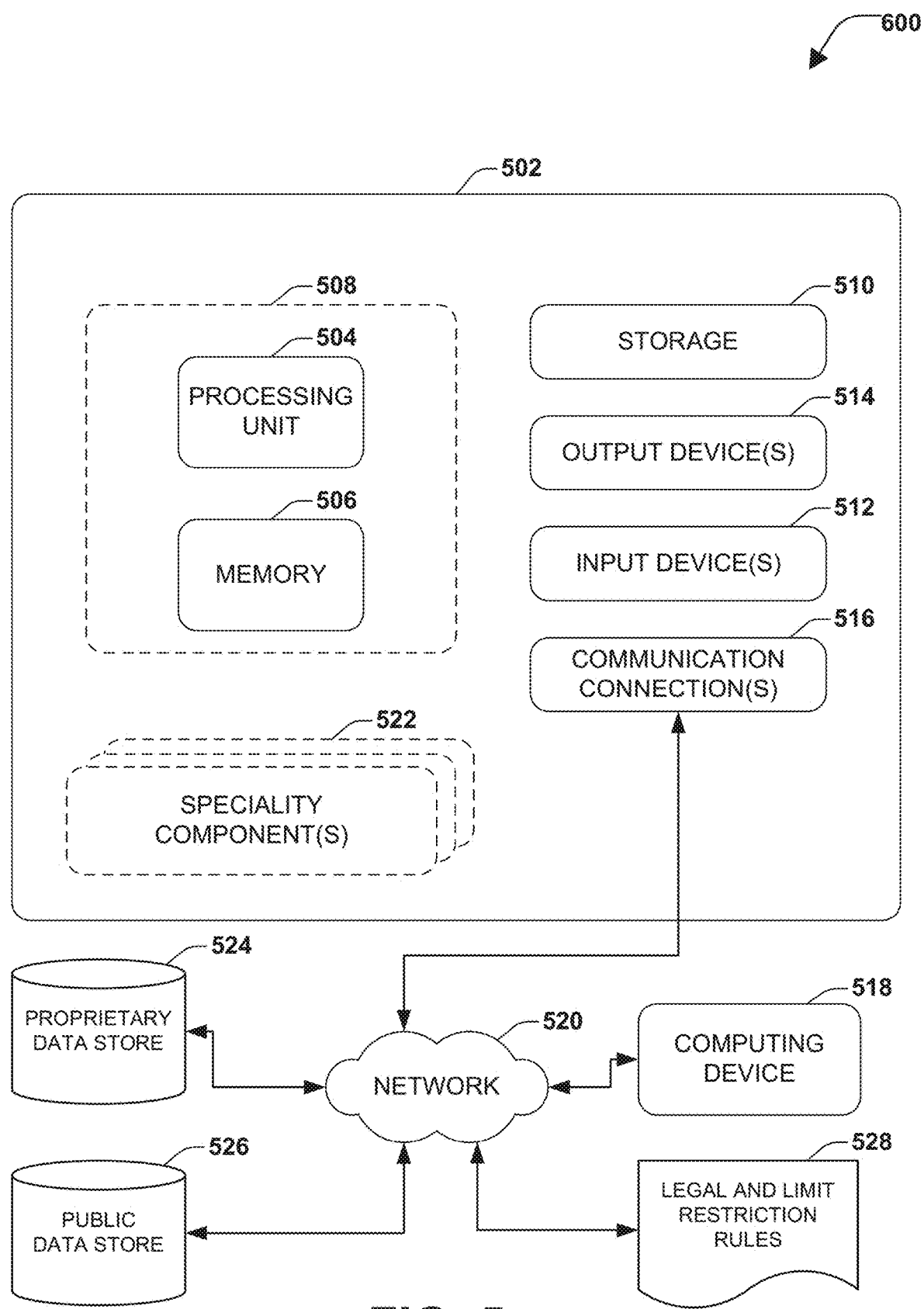
FIG. 5 is an illustration of an example computing environment where one or more of the provisions set forth herein can be implemented, according to one or more embodiments.

FIG. 5 and the following discussion provide a description of a suitable computing environment to implement embodiments of one or more of the provisions set forth herein. The operating environment of FIG. 5 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as discussed herein. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 5 illustrates a system 500 including a computing device 502 configured to implement one or more embodiments provided herein. In one configuration, computing device 502 includes at least one processing unit 504 and memory 506. Depending on the exact configuration and type of computing device, memory 506 may be volatile, such as RAM, non-volatile, such as ROM, flash memory, etc., or a combination of the two. This configuration is illustrated in FIG. 5 by dashed line 508.

In other embodiments, device 502 includes additional features or functionality. For example, device 502 may include additional storage such as removable storage or non-removable storage, including, but not limited to, magnetic storage, optical storage, etc. Such additional storage is illustrated in FIG. 5 by storage 510. In one or more embodiments, computer readable instructions to implement one or more embodiments provided herein are in storage 510. Storage 510 may store other computer readable instructions to implement an operating system, an application program, etc. Computer readable instructions may be loaded in memory 506 for execution by processing unit 504, for example.

The term "computer readable media" as used herein includes computer storage media. Computer storage media includes volatile and nonvolatile, removable and non-removable media implemented in any method or technology for storage of information such as computer readable instructions or other data. Memory 506 and storage 510 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by device 502. Any such computer storage media is part of device 502.

Device 502 includes input device(s) 512 such as keyboard, mouse, pen, voice input device, touch input device, infrared cameras, video input devices, or any other input device. Output device(s) 514 such as one or more displays, speakers, printers, or any other output device may be included with device 502. Input device(s) 512 and output device(s) 514 may be connected to device 502 via a wired connection, wireless connection, or any combination thereof. In one or more embodiments, an input device or an output device from another computing device may be used as input device(s) 512 or output device(s) 514 for computing device 502. Device 502 may include communication connection(s) 516 to facilitate communications with one or more other devices 518, and such communication may occur over a network, for example network 520. [from 209: Additionally, modules or components may be provided that are specialty components 522, for example, as may be seen in FIG. 1, replicator module 104, and translator module 116 are examples of specialty components 522. Specialty components 522 may be configured, for example, in order to transform data structures in a particular manner, or for another example, specialty components 522 may enable machine learning processes to interact with data sets. Other specialty components 522 may be configured to provide interactions with users in either a bulk or batch mode, or in an interactive setting.

ADDITIONAL EMBODIMENTS AND DISCLOSURE

The following discussion is provided to give additional context to the innovation's feature, functions and benefits. As such, it is to be understood that the aforementioned system components and methodologies can employ the details that follow.

A type of complex machine learning deals with Supervised Machine Learning "SML." SML applications may include such as Gradient Boosting "GB", Random Forest "RF", and Neural Networks "NN", and are recognized for their increased predictive performance. This is especially true with large data sets (millions or more observations and hundreds to thousands of predictors). However, the complexity of the SML models makes them opaque and hard to interpret on their own. Embodiments herein disclosed include innovative global and local diagnostics for interpreting (or replicating) and providing an ability to create and translate an explanatory mapping of complex machine learning applications, including SML models. This innovation contrasts with traditional or conventional Locally Interpretable Models and Effects "LIME" and K-means partitioning "KLIME" approaches. LIME-SUP may instead be based on fitting trees to the fitted response (LIM-SUP-R) as well as the derivatives of the fitted response (LIME-SUP-D).

Technical improvements in regards to replicated structures Use of these technical embodiments may be more immediately beneficial in certain environments, such as banking and finance which are regulated, and where such model interpretation may play a more important role in dealing with those industries. While some examples and discussion of embodiments may be drawn to those industries for simplicity in explanation, it is to be appreciated that the innovation is not limited to a particular technical environment in the sense of one industry or another. It is to be appreciated that the innovation instead provides a technical improvement due to the technical nature itself.

It is to be appreciated in the integrated local and global effect modeling of this innovation that both global diagnostic and local diagnostic techniques are leveraged. Global diagnostics may be aimed at interpreting an overall relationship between input variables and response variable (over an entire model space). On the other hand, local diagnostics may be aimed at understanding interactions in smaller, local regions, with a possible aim of replicating (or fitting) a simple parametric model may be used to approximate the input-output relationship. While inferior and limited in operation, perhaps the most well-known locally interpretable model currently is LIME. KLIME, a variant of LIME, has been proposed for a purpose to expand fitting locally interpretable models on an entire input space. KLIME partitions the input space into K partitions using clustering techniques (typically K-means) and then fits local models within each cluster. The value of K is chosen so that the predictions from all the local models will maximize. However, this method relies on unsupervised partitioning, and can be unstable, yielding different partitions with different initial locations. Additionally, unsupervised partitioning may not incorporate underlying model information which may impact preserving the underlying model structure. K-means partitions the input space according to Voronoi diagrams, which may have limits in various applications.

In contrast, the disclosed innovation uses supervised partitioning (tree algorithms) and then fits a local model. In other words, fitting local models to both a fitted response (LIME-SUP-R) and fitted derivatives (LIME-SUP-D).

In a LIME-SUP-R approach, parametric model-based trees may be fitted both to decide on partitions and to fit a local model within each partition. It is to be appreciated that if a parametric model is a good fit in a given region, no further partitioning need be required. In a LIME-SUP-D approach, piecewise constant trees may be fitted as more of a focus on determining when the partial derivatives change is taken. In some embodiments, model based trees may be fit to the derivatives as well.

LIME-SUP Methodology—LIME-SUP-R Based on Model-Based Trees

In an embodiment, an original dataset for a SML algorithm may be partitioned into three: i) training; ii) validation; and iii) testing. Local models are also developed, validated and their performances assessed on these three data sets respectively.

An embodiment of LIME-SUP-R may works as follows:

Let $\{X_{1i}, \ldots, X_{ki}, i=1, \ldots N\}$ be the set of predictor (independent) variables used to train the original SML algorithm, where N is the number of training dataset observations. These will be used for partitioning and model fitting for the trees. In some cases, there may be separate sets of variables $\{X_1, \ldots, X_k\}$ for modeling and $\{Z_1, \ldots, Z_l\}$ for partitioning, and these may present alternate embodiments to pursue for subsets of all variables.

Let $\{\hat{Y}_i, i=1, \ldots, N\}$ be the fitted responses from an SML application (or algorithm) which will be used in the supervised partitioning applications (or algorithm). It is to be appreciated that "algorithm" may be used for ease of explanation, given the applied mathematics involved in some of the details, and that algorithm may be used interchangeably with "application." As such, the sense of "algorithm" is not to be taken in a strict "math" sense.

It is to be appreciated that this step may apply to either or both of continuous and binary responses. The innovation disclosed is robust and handles one, the other, or both. For continuous response, they are the fitted responses, and for binary response, they will be predicted probabilities or logits of the fitted probabilities.

For a specified class of parametric model (say for example, linear regression model with no interactions), a model-based tree may be fitted to the responses and predictors in a training dataset. Specifically, an overall parametric model (from the specified class) may be fitted at a root node to the (fitted SML) responses and predictors. A best split to partition the root node into two child nodes may then be found. This may be done by (again) fitting the same class of parametric models to all possible pairs of child nodes and determining the "best" partition. This may involve searching over all partitioning variables and possible splits within each variable and optimizing a specified fit criterion such as mean square error ("MSE") or deviance. Until a specified stop criterion is met, splitting may continue. Specified stop criteria may include, for example, max depth, minimum number of observations in the child node, or satisfactory fit. A resultant tree may then be pruned back the tree using a selected model fit statistics such as $R^2$, improvement in $R^2$, improvement in sum squared error "SSE," and the like, on the validation dataset. After pruning, a regularized regression algorithm (such as Least Absolute Shrinkage and Selection Operator "LASSO") may be used to fit a sparse version of the parametric model at each node. It is to be appreciated that using regularized models during a tree-building phase may tend to be time consuming.

It is to be appreciated that finding a best partition may use multiple approaches in multiple embodiments. An approach may be to exhaustively search all combinations of partitioning variables and candidate split points (e.g., percentiles). Another approach may be to apply an M-Fluctuation test, which is a fast algorithm to select the best partitioning variables, although this approach may not always pick the variable that minimizes an SSE. An approach is a Hybrid M-Fluctuation approach. M-Fluctuation test may be used as a filtering step and then exhaustive search may be applied for the top few variables.

LIME-SUP Methodology—LIME-SUP-D

An approach to LIME-SUP-D may be similar to LIME-SUP-R but with several differences. A response(s) for a tree algorithm may be based on first partial derivatives of fitted responses (from SML algorithms). For example, $$\left\{\frac{\delta \hat{Y}_i}{\partial x_k}, i=1,\ldots,N; k=1,\ldots,K\right\},$$

instead of fitted responses such as $\{\hat{Y}_i, i=1, \ldots, N\}$. Derivatives may be scaled appropriately before applying the step. In an embodiment, before splitting at each node, standard deviations of each independent variable may be computed and corresponding partial derivatives multiplied by these standard deviations. For example, let $SD_k$=std, dev$\{X_{k1}, \ldots, X_{KN}\}$. Partial derivatives may then be $$\left\{S\left(\frac{\delta \hat{Y}_i}{\partial x_k}\right) = \frac{\partial \hat{Y}_i}{\partial x_k} \times SD_k, i=1, \ldots N, k=1, \ldots, K\right\},$$

and these may be used as a N×K matrix of responses.

Embodiments may vary in different ways to fit a multivariate response to independent variables. For example, multivariate regression techniques may be used to fit a model to a N×K matrix of responses; or N responses for all K variables may be stacked into a single vector, a matrix of predictor variables may be repeated K times and may be treated as a single regression application. In some embodiments, a model fit to a N×K matric may be modified to treat columns as independent.

In another embodiment, a class of parametric models for LIME-SUP-D may correspond to be one-order lower than those considered for LIME-SUP-R since derivatives are being modeled. For example, if we consider fitting linear regression models for LIME-SUP-R, then a piecewise constant tree may be fitted to each node, since a derivative corresponds to coefficients of the liner regression model. It is to be appreciated that fitted model within each node may be used to obtain predicted values. For embodiments fitting a piecewise constant tree within each node, a fitted value will be the average of all the observations within each node. Derivatives may be readily available for NNs through back propagation. Finite differences may be used to approximate the derivatives from a fitted response surface for some machine learning applications such as GB and RF. In other embodiments a Neural Net surrogate model may be fitted to responses of GB and RF and derivatives from the Neural Net obtained.

The innovation introduces two classes of locally interpretable models and effects based on supervised partitioning: i) LIME-SUP-R and ii) LIME-SUP-D. Investigations show that both classes perform better than KLIME methods. Further, LIME-SUP-R has better performance in terms of predictive accuracy and interpretability.

It is to be appreciated that LIME-SUP provides advantages over KLIME methods. Supervised partitioning leads to the use of the underlying model structure in developing the partitions, and approximates original models better, thus may lead to more meaningful partitions. For example, processing economy may be realized since for underlying local model that are linear, LIME-SUP will not split the node further. LIME-SUP may capture most any nonlinearity or interactions through partitioning, and splits may be optimized to capture accurately where nonlinearity or interactions occur, providing interpretability. Higher-order local models that can incorporate quadratic nonlinear effects and simple interactions directly are supported. Supervised partitioning leads to more stable trees. Tree structure is easy to understand; its hierarchical structure lays out the most important, second most important segmentation feature, and the like. Further, upper level tree nodes offer a semi-global level interpretation, and provide a model segmentation scheme with a small number of segments. It is to be appreciated that for applications on global rather than local effects, less noise may be provided, increasing stability of the trees and may alleviate overfitting, even for deeper trees.

The disclosed innovation shows various selected characteristics of explanatory mapping or semi-additive index data structures that from global effect models (for example, Partial dependence plots "PDPs", marginal plots and as accumulated local effects "ALE" plots may be unified under a derivative-based approach, and may be leveraged. In particular, the disclosed innovation shows that marginal plots are equivalent to ATDEV plots, a set of newly proposed derivative-based plots from the summation of ALE plots for "direct effects" and other plots termed as accumulated local transferred effects "ATE" plots for "indirect effects".

Selected characteristics that may be generated into a subset of visual representations of a semi-additive index data structure related to explanatory mapping may include a suite of a matrix plot and a heat maps to visualize the decomposition of ATDEV plots (or marginal plots) into ALE and ATE plots, and create measures of each component that add up to total variable importance for variable selection. Based on conditional distributions, the disclosed innovative derivative interpretation tools are most all free of extrapolation risk. The data structure is also much more computationally effective compared with PDPs.

The disclosed innovation may provide an ability to interpret specific machine learning fitting response surfaces and relationships with covariates. Different complex machine learning algorithms may have different interpretation on the relationship between response and covariates, which may not be consistent with a true item being modeled. For example, with highly correlated inputs, different algorithms may have different allocation of the explanation power among the correlated inputs, but still have very similar final predictions. With the disclosed innovation, ATDEV plots and marginal plots may show very similar shapes from different algorithms for a certain variable, and which may account for an overall effect including dependence of other correlated variables. ALE and ATE plots may show how different algorithms allocate explanation power among the correlated inputs. Thus, the disclosed innovation facilitates resolution of "identifiability" concerns for collinearity for the parametric model.

It is to be appreciated that terminology in the following explanation is used for ease of explication and is not an indication that "math" is being claimed as the innovation.

Relationships Among PDP, Marginal and ALE Plots

Let $f(x_1, \ldots, x_p)$ be the fitted function of interest from some algorithms with p-dimensional input. Recall the definitions of one dimensional (or 1D) items such as for example 1D-PDP, 1D-Marginal and 1D-ALE for $x_j$:

$$f_{PDP}^{(1)}(x_j) = E_{\setminus X_j}\{f(x_j, \setminus X_j)\},$$

$$f_M^{(1)}(x_j) = E_{\setminus X_j | X_j}\{f(X_j, \setminus X_j) | X_j = x_j\},$$

$$f_{ALE}^{(1)}(x_j) = \int_{Z_{j,0}}^{x_j} E_{\setminus X_j | X_j}\{f^1(X_j, \setminus X_j) | X_j = z_j\} dz_j$$

Here, $\setminus x_j = (x_1, \ldots, x_{j-1}, x_{j+1}, \ldots, x_p)$ represents the (p−1) dim input vector without $x_j$, and $$f^1(x_j \backslash x_j) \triangleq \frac{\partial f(x_j, \backslash x_j)}{\partial x_j}$$

is the 1st order partial derivative of f(·) with respect to $x_j$.

From the above definitions $f_{ALE}^{(1)}(x_j)$ is the only one based on derivatives. Later PDP and Marginal plots are shown as being able to be written in the derivative-based forms and are intrinsically connected to ALE. We first show the relationship among the three plots for independent data.

Proposition 1

For independent data, PDPs, Marginal plots and ALE plots are equivalent up to constant difference.

Explication $$f_M^{(1)}(x_j) = E_{\backslash X_j | X_j}\{f(X_j, \backslash X_f) | X_j = x_j\} = E_{\backslash X_j}\{f(X_j, \backslash X_f)\} = f_{PDP}^{(1)}(x_j),$$

$$f_{ALE}^{(1)}(x_j) = \int_{z_{j,0}}^{x_j} E_{\backslash X_j | X_j}\{f^1(X_j, \backslash X_f) | X_j = z_j\} dz_j = \int_{z_{j,0}}^{x_j} E_{\backslash X_j}\{f^1(z_j, \backslash X_j)\} dz_j =$$

$$E_{\backslash X_j}\left\{\int_{z_{j,0}}^{x_j} f^1(z_j, \backslash X_j) dz_j\right\} = E_{\backslash X_j}\{f(X_j, \backslash X_j) + C(\backslash X_j)\} =$$

$$E_{\backslash X_j}\{f(X_j, \backslash X_j)\} + C = f_{PDP}^{(1)}(x_j) + C,$$

where $C(\backslash X_j)$ is a function of $\backslash X_j$, and $C = E_{\backslash X_j}\{C(\backslash X_j)\}$ is a constant.

In practice, independence assumption may be too strong to hold for real-world data, especially when the data is trained with black box algorithms without variable selection. Although correlation is usually not a concern for model prediction, it poses great challenges to model interpretation and inference. In conventional regression models, it is well known that large correlation or multicollinearity can cause instable parameter estimation which makes the statistical inference unreliable. The same is true for black box supervised algorithms. What makes it worse for black box algorithms is that although different methods such as virtual interface "VIF" diagnostics, filtering and variable selection are usually applied before building regression models to rule out highly correlated variables, similar dimension reduction techniques for black box algorithms, whose primary goal is to improve prediction performance with large number of inputs, are seldom applied. When data are correlated, there are 2 major complications that may impact existing black box diagnostic tools:

1. Certain areas of the sample space can be sparse or even empty with highly correlated variables. In such cases, permutation tests and PDP calculations are biased due to extrapolation issue.
2. Due to correlation, 1st order effect of a certain variable can come from itself (i.e., the main effect), the main effects of other variables correlated with it, and the interactions between it and its correlated variables. There is no clean decomposition of the total effect into main effect and interaction effect because the impact from other variables through correlation is confounded with both. In such cases, the analysis of variance "ANOVA"-decomposition is no longer available.

It is to be appreciated that variables may be continuous or binary. In correlated cases, let's first assume all the variables are continuous and focus on variable $x_j$. Binary variables will be discussed later. Assume that for any $x_i \in \backslash x_j$, its dependency on $x_j$ can be modeled through the following form $x_i = h_i(x_j) + e_i$, where is $e_i$ random noise with 0 mean and independent of $x_j$.

Recall the definition of first order "total derivative":

$$f^{T1}(x_j, \backslash x_j) = \frac{df(x_j, \backslash x_j)}{dx_j} =$$

$$\frac{\partial f(x_j, \backslash x_j)}{\partial x_j} + \sum_{i \neq j} \frac{\partial f(x_j, \backslash x_j)}{\partial x_i} \frac{dx_i}{dx_j} \triangleq f^1(x_j, \backslash x_j) + \sum_{i \neq j} f^1(x_i, \backslash x_i) \frac{dh_i(x_j)}{dx_j}$$

Note that the partial derivative $f^1(x_j, \backslash x_j)$ used to formulate ALE is part of $f^{T1}(x_j, \backslash x_j)$.

The 1st order ATDEV of $x_j$ are defined by taking conditional expectation of $f^{T1}(X_j, \backslash X_j)$ given $X_j = z_j$ and integrate over $z_j$:

$$f_{Tot}^{(1)}(x_j) = \int_{z_{in}}^{x_j} E_{\backslash X_j | X_j}\{f^{T1}(z_j, \backslash X_f) | X_j = z_j\} dz_j = \quad \text{Eq(1)}$$

$$\int_{z_{j,0}}^{x_j} E_{\backslash X_j | X_j}\{f^1(X_j, \backslash X_j) | X_j = z_j\} dz_j +$$

$$\sum_{i \neq j} \int_{z_{j,0}}^{x_j} E_{\backslash X_j | X_j}\left\{f^1(X_j, \backslash X_i) \frac{dh_i(X_j)}{dX_j} | X_j = z_j\right\} dz_j$$

Note that the first part on the right hand side "RHS" of Eq(1) is 1D ALE, $f_{ALE}^{(1)}(x_j)$, and in the second part, for the $i^{th}$ component in the summation, let $$f_i^{(1)}(x_j) \triangleq \int_{z_{j,0}}^{x_j} E_{\backslash X_j | X_j}\left\{f^1(X_i, \backslash X_i) \frac{dh_i(X_j)}{dX_j} | X_j = z_j\right\} dz_j$$

be the 1D ATE of $x_j$ through $x_i$.

Therefore, $f_{Tot}^{(1)}(x_j)$ can be written as the summation of ALE and ATE:

$$f_{Tot}^{(1)}(x_j) = f_{ALE}^{(1)}(x_j) + \sum_{i \neq j} f_i^{(1)}(x_j) \quad \text{Eq(2)}$$

The formulation of 1D ATDEV in Eq(2) suggests the total effect of variable $x_j$ is a summation of the effects contributed exclusively by itself, represented by $f_{ALE}^{(1)}(x_j)$, and the mutual effects between itself and other variables which are transferred through other correlated variables, represented by $f_i^{(1)}(x_j)$, for $i \neq j$. Note that $f_i^{(1)}(x_j) = 0$ when $x_i$ is independent of $x_j$, which suggests that $f_{Tot}^{(1)}(x_j)$ will reduce to $f_{ALE}^{(1)}(x_j)$ if $x_j$ is independent of all the other variables.

Now, let's rewrite $f_{PDP}^{(1)}(x_j)$ and $f_M^{(1)}(x_j)$ in derivative-based forms. For $f_{PDP}^{(1)}(x_j)$, by expressing $f(x_j, \backslash X_j)$ as the sum of the integral of partial derivatives and a function of other variables, and switching the order of double integrals, we have $$f_{PDP}^{(1)} = E_{\backslash x_j}\{f(x_j, \backslash X_j)\} = E_{\backslash x_j}\left\{\int_{z_{j,0}}^{x_j}\frac{\partial f(z_j, \backslash x_j)}{\partial z_j}dz_j + C(\backslash x_j)\right\} = \quad \text{Eq (3)}$$

$$\int_{\backslash x_j}\int_{z_{j,0}}^{x_j}\frac{\partial d(z_j, \backslash x_j)}{\partial z_j}dz_j p(\backslash x_j)d\backslash x_j + C =$$

$$\int_{z_{j,0}}^{x_j}\int_{\backslash x_j}f^1(z_j, \backslash x_j)p(\backslash x_j)d\backslash x_j dz_j + C = \int_{z_{j,0}}^{x_j}E_{\backslash X_j}\{f^1(z_j, \backslash X_j)\}dz_j + C$$

From Eq (3), $f_{PDP}^{(1)}(x_j)$ is similar to $f_{ALE}^{(1)}(x_j)$ in that both of them are based on partial derivative $f^1(x_j, \backslash x_j)$. However, unlike $f_{PDP}^{(1)}(x_j)$ which is defined with marginal distribution, $f_{ALE}^{(1)}(x_j)$ is defined with conditional distribution that protects it from the extrapolation issue in correlated cases.

For marginal plots, leveraging a definition of total derivatives provides the following proposition:

Proposition 2

$$f_M^{(1)}(x_j) \equiv f_{Tot}^{(1)}(x_j) + C \quad \text{Eq(4)}$$

Explication of Proposition 2

Let $x_i = h_i(x_j) + e_i$, where $e_i$ is random noise with 0 mean and independent of $x_j$. Thus $$\backslash x_j = (x_1, \ldots, x_{j-1}, x_{j+1}, \ldots, x_p) =$$
$$(h_1(x_j) + e_1, \ldots, h_{j-1}(x_j) + e_{j-1}, h_{j+1}(x_j) + e_{j+1}, \ldots, h_p(x_j) + e_p)$$

$$f_M^{(1)}(x_j) = E\{f(X_j, \backslash X_j) | X_j = x_j\} =$$

$$\int_{\backslash x_j} f(x_j, \backslash x_j)p(\backslash x_j | x_j)d\backslash x_j = \int_e f(x_j, h(x_j) + e)p(h(x_j) + e | x_j)de =$$

$$\int_e f(x_j, h(x_j) + e)p(e)de = \int_e \left(\int_{z_{j,0}}^{x_j}\frac{df(z_j, h(z_j) + e)}{dz_j}dz_j + C\right)p(e)de =$$

$$\int_{z_{j,0}}^{x_j}\int_e \frac{df(z_j, h(z_j) + e)}{dz_j}p(e)dedz_j + C =$$

$$\int_{z_{j,0}}^{x_j}E_e\left\{\frac{df(z_j, h(z_j) + e)}{dz_j}\right\}dz_j + C = \int_{z_{j,0}}^{x_1}E_e\{f^{T1}(z_j, \backslash X_j)\}dz_j + C$$

Similarly, $$f_{Tot}^{(1)}(x_j) =$$

$$\int_{z_{j,0}}^{x_1}E\{f^{T1}(z_j, \backslash X_j) | X_j = z_j\}dz_j = \int_{z_{j,0}}^{x_1}\int_{\backslash x_j}f^{T1}(z_j, \backslash x_j)p(\backslash x_j | z_j)d\backslash x_j dz_j =$$

$$\int_{z_{1,0}}^{x_1}\int_e f^{T1}(z_j, \backslash x_j)p(h(z_j) + e | z_j)dedz_j =$$

$$\int_{z_{1,0}}^{x_1}\int_e f^{T1}(z_j, \backslash x_j)p(e)dedz_j = \int_{z_{1,0}}^{x_1}E_e\{f^{T1}(z_j, \backslash X_j)\}dz_j$$

Therefore, $f_M^{(1)}(x_j) \equiv f_{Tot}^{(1)}(x_j) + C$.

The above proposition implies that $f_M^{(1)}(x_j)$ and $f_{Tot}^{(1)}(x_j)$ takes different paths to measure the same effect. $f_M^{(1)}(x_j)$ directly calculates the averages of the model fits conditional on different values of $x_j$, whereas $f_{Tot}^{(1)}(x_j)$ "detours" by taking derivatives, calculating conditional averages and doing integrations. Both measure the overall effect of $x_j$. However, the extra effort taken by $f_{Tot}^{(1)}(x_j)$ is rewarded by being able to separate ALE and ATE between $x_j$ and each of the other variables in the model.

Proposition 3

For purely additive $f(\cdot)$, $$f_{ALE}^{(1)}(x_j) \equiv f_{PDP}^{(1)}(x_j) ++ C \quad \text{Eq(6)}$$

Explication

Let $$f(x_1, \ldots, x_J) = g_1(x_1) + g_2(x_2) + \ldots + g_P(x_J)$$

$$f_{PDP}^{(1)}(x_j) = E_{\backslash X_j}\{g_1(x_1) + g_2(X_2) + \ldots + g_P(X_J)\} = g_1(x_1) + C,$$

$$f_{ALE}^{(1)}(x_j) = \int_{z_{j,0}}^{x_j}E\left\{\frac{\partial f(X_j, \backslash X_j)}{\partial X_j}\bigg| X_j = z_j\right\}dz_j = \int_{z_{j,0}}^{x_j}g'_j(z_j)dz_j = g_1(x_1) + C,$$

Thus, $f_{ALE}^{(1)}(x_j) \equiv f_{PDP}^{(1)}(x_j) + C$.

Note that Eq(6) holds for any purely additive function, regardless of data correlations. However, in the implementation, the equivalence may not be true as we assume $f(x_1, \ldots, x_J)$ is known outside the variable support, and PDP requires extrapolation for f.

Through the formulation of Eq(3)-Eq(5), it is clear that the following can be surmised:
- 1D PDP plots do not address correlation at all
- 1D marginal (or 1D ATDEV) plots address correlations through total derivatives, and represent "total effect" or "overall effect" of a given variable
- 1D ALE plots address correlations through partial derivatives, and account for the exclusive contribution, or "direct effect", of a given variable Computation: computation complexity may vary across different plots. Computation of marginal plots is the most straightforward among the plots discussed as it does not require any scoring of out-of-sample data or calculating derivative and integrals. In general, marginal plots are always the fastest to generate, and are robust in reflecting in response surface. The computation of PDPs, by comparison, can be quite slow due to specifying grid points and scoring extrapolated data points based on the grid points. The computation of ALE, ATE and ATDEV is complicated but usually faster than PDPs. Such may involves several steps as follows:

1. Calculate partial derivative $f^1(x_j, \backslash x_j)$ for each in-sample data point for given j;

2. Calculate derivatives of $$\frac{dh_i(x_j)}{dx_j}$$

for given i and j;

3. Estimate the conditional expectations in Eq(1);
4. Integrate the averages across $x_j$.

It is to be appreciated that there may be at least two ways to obtain $f^1(x_j,\backslash x_j)$, in step 1, analytically or numerically. The analytical approach may be limited to algorithms with closed-form gradients, for example, NN, where the gradient functions can be extracted from the fitted algorithm and score new gradients on any give data points. This is accurate and convenient for calculating $f^1(x_j,\backslash x_j)$ for continuous variables. For algorithms without closed-form gradients, e.g., the tree-based algorithms, one may approximate the derivatives with numerical differences.

It is worth mentioning that even when a prediction model itself does not have closed-form gradients, one may fit a NN surrogate model to the prediction model scores, and get model performance comparable to, if not better than, the original prediction models.

In step 2, It is to be appreciated that different ways may be used to specify $h_i(x_j)$. For simplicity, a preferred use is linear regression with ordinary least square "OLS" for $h_i(x_j)$ for non-skewed continuous $x_i$ and logistic regression for binary $x_i$. It is to be appreciated that other manners, such as for example, specify $h_i(x_j)$ with more complicated functional forms using splines or local smoothing, may be used. When $x_i$ is continuous but heavily skewed, special treatment is may be used for robust estimation of $$\frac{dh_i(x_j)}{dx_j}$$

Derivatives for Binary Variables

Derivative based methods may call for variables to be continuous and response surfaces to be differentiable. Difficulty may be encountered in obtaining derivatives for the jumpy response surface or discrete variables. For the jumpy response surface, building NN surrogate model as a portion of a replication step may help smooth fitted response surfaces and may help generate derivatives. Thus, for binary variables, it is to be appreciated that adjustments may be made. Neural Networks treat binary variables as continuous in model training so that the response surface can be a non-linear function of $x_j$ in theory, and the resulted gradient of $f^1(x_j,\backslash x_j)$ can have different values at $x_j=0$ and $x_j=1$ given that all the other variables are fixed. However, the effect of $x_j$ for most any sample point may be represented by connecting $f^1(x_j=0,\backslash x_j)$ and $f(x_j=1,\backslash x_j)$ through a straight line with constant derivatives. In order to force $f^1(x_j,\backslash x_j)$ to be constant for binary $x_j$ we define $f^1(x_j,\backslash x_j)$ for binary variable through numerical difference:

$$f^1(x_j, \backslash x_j) = f(x_j = 1, \backslash x_j) - f(x_j = 0, \backslash x_j).$$

It is to be appreciated that limitations exist. First, for Step 1, since each individual only takes one value of 0 and 1 for $x_j$, prediction with the other value requires extrapolation. Secondly, the numerical implementation of integrals discretizes continuous space into finite small intervals. The convergence of the numerical calculation to the theoretical value may call for intervals as small as possible. For continuous variables, having usually M>10 bins to accumulate in the integral calculation in Step 4. Such numerical integration may not be reasonable for the binary variables with only two bins and different average gradients in these two bins. The different gradients suggest the "true" underlying curve is nonlinear between 0 and 1. However no observations may be in the middle. To remediate such issue, linear interpolation may be used between the two average gradient values at 0 and 1, obtain the values of $f_{ALE}^{(1)}(x_j)$ and $f_i^{(1)}(x_j)$ at 0 and 1 by numerical integration as for continuous variables, and connect these two values to generate the straight lines. By taking this approach, linear or quadratic curve between 0 and 1 may be recovered, but may have bias when a true model has higher orders great than two. Nevertheless, this still helps in reducing the accumulation errors with only two bins. In an alternative embodiment, an approach may be to handle binary variables in derivative based diagnostics by creating middle points between 0 and 1 through Monte Carlo simulation.

Visualizations

Based on the disclosed innovation, selected characteristics may be rendered with a graphical user interface, for example, a graphical user interface such as graphical user interface 120 of computing system 102.

ATDEV Plot Matrix

In some embodiments, and for p covariates in a model, a p by p plot matrix may be created, where the subplot in row i and column j displays the centered 1D ATE plot $f_i^{(1)}(x_j)-E\{f_i^{(1)}(x_j)\}$ if i≠j, and displays the centered 1D ALE plot $f_{ALE}^{(1)}(x_j)-E\{f_{ALE}^{(1)}(x_j)\}$ if i=j. In other words, the subplots in column j may represent the effect of $x_j$ on the fitted response through different paths: the diagonal plot (j,j) may represent the contribution of $x_j$ on f(·) "exclusively" from itself, and the off-diagonal plots represent the effect of $x_j$ on f(·) through its correlated variables. The non-zero off-diagonal subplots show two things simultaneously: a) the two corresponding variables are correlated, i.e., $$\frac{dh_i(x_j)}{dx_j} \ne 0,$$

and b) the row variable, or the "mediator", has a non-zero effect on the fitted response, i.e., $f^1(x_i,\backslash x_i) \ne 0$. Note that the shape of the curves in the off-diagonal subplot $f_i^{(1)}(x_j)$ is decided by both $f^1(x_i,\backslash x_i)$ and $$\frac{dh_i(x_j)}{dx_j}.$$

When $$\frac{dh_i(x_j)}{dx_j}$$

is a constant slope estimated from OLS, thus shape of $f_i^{(1)}(x_j)$ may follow the shape of the diagonal plot $f_{ALE}^{1}(x_i)$ for the mediator $x_i$.

ATDEV and Marginal Plots Overlay

By adding up the subplots in each column of ATDEV plot matrix, a centered 1D ATDEV plot $f_{Tot}^{-1}(x_j)-E\{f_{Tot}^{(1)}(x_j)\}$ for each of the p covariates in a model may be obtained. Per the disclosed proposition 2, the result may be consistent with centered 1D marginal plots $f_M^{(1)}(x_j)-E\{f_M^{(1)}(x_j)\}$, j–1, ..., p'. As disclosed, the calculation of $f_M^{(1)}(x_j)$ may be simple and straightforward, whereas calculation of $f_{Tot}^{(1)}(x_j)$ may be much more complicated and subject to approximation errors from calculating derivatives and numerical integration, as well as estimation bias of $$\frac{dh_i(x_j)}{dx_j}$$

due to misspecification of $h_i(x_j)$. Any of these errors may cause the deviation of $f_{Tot}^{(1)}(x_j)$ from $f_M^{(1)}(x_j)$. Creating an overlay of centered 1D ATDEV plot and centered 1D marginal plot for each variable in the model may provide a diagnostic tool that may detect most any possible errors occurring in a calculation of $f_{Tot}^{(1)}(x_j)$.

ATDEV Variance Heat Map

For a subplot (i, j) in the ATDEV plot matrix:

$$v_{ij} = \begin{cases} \text{Var}(f_i^{(1)}(x_j)), & i \neq j \\ \text{Var}(f_{ALE}^{(1)}(x_j)), & i = j \end{cases}$$

may be defined as a score relating measurement of importance of the corresponding effect on the fitted response. Thus each subplot may be represented by a single positive number, and the whole matrix may be visualized through a heat map, where brighter cells indicate higher scored levels of importance.

Adding up $v_{ij}$ of each column, $$v_{\cdot j} = \sum_{i=1}^{p} v_{ij}$$

may correspond to ATDEV importance of each variable in a model. It is to be appreciated that $v_{\cdot j}$ may not add up to the variance of the marginal plots which accounts for obol indices total sensitivity $v_{\cdot j}$ which can be visualized through bar chart or heat map.

PDPs, Marginal and ALE Plots Overlay

For each covariate in the model, overlays of its 1D PDP, 1D marginal and 1D ALE plots, all centered to remove the differences caused by the constant terms may be created. This may provide the following:

1D marginal curves may be quite different from 1D PDP and 1D ALE as long as there are some correlations in the data. Observation of the overlap of PDP, marginal and ALE curves for a certain variable may indicate variable having little correlation with other variables in the model. The larger the difference between marginal and other two curve, the higher the correlation may be between the targeting variable and other variables.

If marginal plot does not overlap with the other two curves, a good overlap of 1D PDP and ALE plots for a given variable may indicate a variable's major contribution to a model is to be considered additive, and a PDP may not be affected too much by the extrapolation issues in spite of the correlation. On the contrary, if PDP and ALE plots are far from each other, it may suggest either there are interactions between targeting variables and other variables, confounded by correlations, or PDP is contaminated by extrapolations, or both.

The disclosed innovation shows selected characteristics such as PDPs, marginal and ALE may be established through derivative-based approaches. ATDEV plots equivalence to marginal plots, the ability to decompose into ALE and ATE plots to account for variables' individual contributions to the response surface and the effects transferred to one variable through its correlated variables, respectively, have been presented. A suite of visualization tools that facilitate these relations have been provided, which pierce black box effects of correlated variables, provide scores and ability to rank relative importance of each decomposed effect, and also score possible extrapolation of PDPs.

It is to be appreciated that 2D ALE and ATEs may be used to explain the 2-way interactions between two uncorrelated variables, and the interaction between this particular 2-way interaction term and another variable that are correlated with any of these two variables (e.g., 3-way interaction confounded with correlations).

Semi-Additive Index Data Structure

Embodiments centered on discussions of a semi-additive index data structure are disclosed. It is to be appreciated that creating a structure that imposes some constraints on the network architecture and may thereby provide better insights into an underlying model. Structure may be used to generate explanatory mapping that describe the features engineered by the network in terms of linear combinations of the input features and univariate non-linear transformations.

It is to be appreciated that terms such as "interpretable" and "explainable" may be used interchangeably. Explainability as a factor by itself need not be sufficient without considering predictive performance. For instance, a linear model is very explainable but it is likely to have poor performance approximating a complex surface.

Feedforward neural networks may consist of fully connected layers, e.g., output of each node on a particular layer may be used as input for each node on a next layer. By limiting the connections between nodes, we can give a feedforward neural network structure that can be exploited for different purposes. The disclosed innovation provides for a replicator component (or module) that can generate a structured neural network designed to be explainable. In other words, interpretability may be provided for explanatory mapping that may describe the features and nonlinear transformations learned through a generated semi-additive index data structure.

Generally, pure additive index models as known in the art, may provide a flexible framework for approximating complex functions. The disclosed innovation provides an alternative formulation of an additive index model as a replicated structured neural network. The data structure of the disclosed innovation is more robust than a pure additive index model, as it may be applied in situations wherein a pure additive index model may not. The data structure may provide a direct approach for fitting model via gradient-based training methods for neural networks. Thus, the disclosed innovation provides an ability to pierce opacity of complex machine learning applications with built-in interpretation mechanisms as well as automated feature engineering. The architecture may be described as follows.

An embodiment of a modified version of the additive index model may be defined as:

$$f(x) = \mu + \gamma_1 h_1(\beta_1^T x) + \gamma_2 h_2(\beta_1^T x) + \ldots + \gamma_K h_K(\beta_K^T x). \quad (2)$$

Although shift parameter µ and scale parameters $\gamma_k$'s need not be identifiable, they are useful for the purposes model fitting: selecting an appropriate number of ridge functions through regularization.

Structure May be Designed to Explicitly Learn the Model Given in Equation (2)

It is to be appreciated that a semi-additive index data structure may be discussed as a neural network based formulation of the additive index mode. This may provide some advantages over a traditional approach. An advantage may be training is enabled using mini-batch gradient-based methods, allowing the formulation to easily be trained on datasets that may be too large to fit in memory at the same time. Further, a formulation may allow leverage of the advancements in general processing unit "GPU" computing used to train neural networks in general. A formulation may also allow straightforward computation of partial derivatives of a function learned by replication. For example, learned by a replicator module 104 of computing system 102. This supports the ability to carry out derivative-based analysis techniques without having to rely on finite difference approximations and the difficulties associated with that method.

Regularization and Parsimony

The overall explainability of the network can be enhanced by using an l1 penalty on both the first and last hidden layers during training. That is, both the projection coefficients ($\beta_j$'s) and the ridge function weights ($\gamma_i$'s) are penalized. When the strength of the penalty is properly tuned, this can produce a parsimonious model that is relatively easily explained.

An l1 penalty on the first hidden layer forces the projection vectors $\beta_i$ to have few non-zero entries, meaning that each subnetwork (and corresponding ridge function) is only applied to a small set of the variables. Similarly, an l1 penalty on the final layer serves to force $\gamma_i$ to zero in situations where fewer subnetworks are needed in the structure than are specified in training.

FURTHER ADDITIONAL EMBODIMENTS AND DISCLOSURE

The following discussion is provided to give additional context to the innovation's feature, functions and benefits. As such, it is to be understood that the aforementioned system components and methodologies can employ the details that follow.

As discussed herein, a type of complex machine learning deals with SML. SML applications may include such as GB, RF, and NN, and are recognized for their increased predictive performance. This is especially true with large data sets (millions or more observations and hundreds to thousands of predictors). However, complexity of the SML models may make them opaque and difficult to interpret or provide documentation in regards to traceability or other imposed requirements. Embodiments herein disclosed include innovative global and local diagnostics for interpreting (or replicating) certain aspects that provide an ability to create and translate an explanatory mapping of complex machine learning applications, including SML models.

Turning now to a discussion concerning global diagnostics, global diagnostics may be aimed at interpreting an overall relationship between input variables (predictors) and response variables.

Models may be comprised of variables, and metrics for those variables may include a computed score for each variable that may measure the importance that variable in the model. It is to be appreciated that there may be a number of different ways to compute scores, and an example approach is described here n. An approach may use a permutation based importance metric. Random permutation of a variable may break an association of a variable with a response to computations with the variable. If the variable is predictive, then prediction accuracy may be expected to decay after permutation. A method may includes steps of making predictions on the training data set, and for each variable $x_j$, randomly permute the variable, keeping other variables unchanged. Additionally or alternatively, steps may include making predictions using the permuted data, computing a change in an automatic update client "AUC" (binary outcome) or change in MSE (continuous outcome) before and after permutation. A permutation importance score may be based at least on the computed changes.

In some embodiments, a model setup may include a user selecting a set of top 20 or so variables and comparing them with a source of subject matter expertise. The nature of their effects can be examined using the PDPs described herein.

Partial Dependence Plots (PDP).

It should be appreciated that graphing techniques may be used to shows the marginal effect of a feature on the predicted outcome of a previously fit model. For example, Partial dependence plots (PDP) are one such technique. PDP may be a 1-D PDP. Ae prediction function may be fixed at a few values of a chosen feature or features and averaged over other features. A 1-D partial dependent "PD" function may be defined as:

$$f_j^{PD}(x_j) = E_{X_{-j}}\{f(x_j, X_{-j})\}$$

A response model f(x) may be estimated by $\hat{f}(x)$, and an empirical distribution of the data may be used to obtain an estimate of the 1-D PD function.

Specifically, the estimate is:

$$\hat{f}_j^{PD}(x_j) = \sum_i \hat{f}(x_j, x_{-j,i})/N$$

Here $x_{-j,i}$ denotes $(x_{1,i}, \ldots, x_{j-1}, x_{j+1,i}, \ldots, x_{p,i})$. It is to be appreciated that two- and higher-order PD functions and plots may be obtained similarly. Additionally 2-d partial plots may be used to assess joint effects of two predictors and examine interaction effects (if such effects exist). In viewing interactions, a tool known in the art, such as for example, H-Statistics, may be used to summarize strength of interaction effect among two variables. For any pair of variables $\{x_j, x_k\}$, the H-statistic is defined as:

$$H_{jk}^2 = \frac{\sum_{i=1}^N [f_{cpar}(x_{ij}, x_{ik}) - f_{cpar}(x_{ij}) - f_{cpar}(x_{ik})]^2}{\sum_{i=1}^N f_{cpar}^2(x_{ij}, x_{ik})}, H_{jk} = \sqrt{H_{jk}^2},$$

where $f_{cpar}$ is the centered partial dependence function.
H-statistics measures the proportion of variation in $f_{cpar}(x_{ij}, x_{ik})$ that is unexplained by an additive model. Its range is between 0 and 1, with a larger value indicating a stronger interaction pattern.

An alternative version of $H_{jk}$ is a relative (scaled) measure. If both the denominator and nominator shrink by half, $H_{jk}$ will not change. In fact, when two variables are irrelevant, both denominator and nominator are small and $H_{jk}$ can be high due to instability. It is to be appreciated that in such cases, just the numerator, called the absolute H-statistic, can also be used:

$$\tilde{H}_{jk}^2 = \frac{1}{N}\sum_{i=1}^{N}[f_{cpar}(x_{ij},x_{ik}) - f_{cpar}(x_{ij}) - f_{cpar}(x_{ik})]^2, \tilde{H}_{jk}^2 = \sqrt{\tilde{H}_{jk}^2}$$

Additional techniques may also be used in conjunction with the disclosed innovation, including for example Individual Conditional Expectation (ICE) Plots and related diagnostics. ICE plots may be defined for each given variable $X_i$, and a plot may be used to visualize $f(X_i, X_{-i})$ from the grid points based on $X_i$. For a given variable i and sample $n=1, \ldots, N$, denote a fitted value from a machine learning algorithm by $\hat{f}(x_i^n, x_{-i}^n)$. For example, one may allow $$x_i = S_k, k = 1, \ldots, K$$

to be grid points by quantiles of $X_i$ if $X_i$ is continuous. For the discrete variable $X_i$ with limited K unique values, the grid points $x_i=S_k$ can be defined by the K unique values. Hence, all the fitted values on the grid points of $x_i$ may be calculated while keeping other variables fixed as in the $n^{th}$ sample, i.e., $\hat{f}(x_i=S_k, x_{-i}^n)$, where $x_{-i}$ denotes the variables other than $x_i$ and the superscript n stands for the observation values for these variables.

It is to be appreciated that treatment may include simplifications. To simplify the notation, $M'_{nk}$ may be used to indicate ICE plot curves.

$$M'_{nk} = \hat{f}(x_i = S_k, x_{-i}^n), k = 1, \ldots, K$$

Thus, when drawing the ICE plot for $x_i$, for each sample n, a path may be drawn (with simplification or pinching), $$\hat{f}(x_i = S_1, x_{-i}^n), \hat{f}(x_i = S_2, x_{-i}^n), \ldots, \hat{f}(x_i = S_K, x_{-i}^n)$$

Another simplification may be undertaken if a data size is oversized. In such a case, paths for a subset of random samples may be drawn.

Various types of ICE plots are contemplated. For example, Centered ICE (CICE) plots are contemplated. A CICE plot may be used to visualize centralized ICE function $M_i(X)=f(X_i, X_{-i})-E(Y|X_{-i})$ and total sensitivity for variable $X_i$. Given the sample n, CICE plot for $X_i$ is to subtract each ICE curve with the mean of the curve.

$$M_{nk} = M'_{nk} - \sum_{k=1}^{K} w_k M'_{nk} = M'_{nk} - M'_{n.}, k = 1, \ldots, K$$

Additionally or alternatively, a normalized CICE plot may be used to visualize normalized CICE function $M_i(X)-M_i(X_i)$ and interaction sensitivity for variable $X_i$. In the implementation, normalized CICE plots can be obtained by subtracting CICE curves with the corresponding partial dependence curves, i.e., $$M_{nk}-M_{.k}$$

where $$M_{.k} = \frac{1}{N}\sum_{n} M_{nk} - \overline{M'}$$

Figure 6:
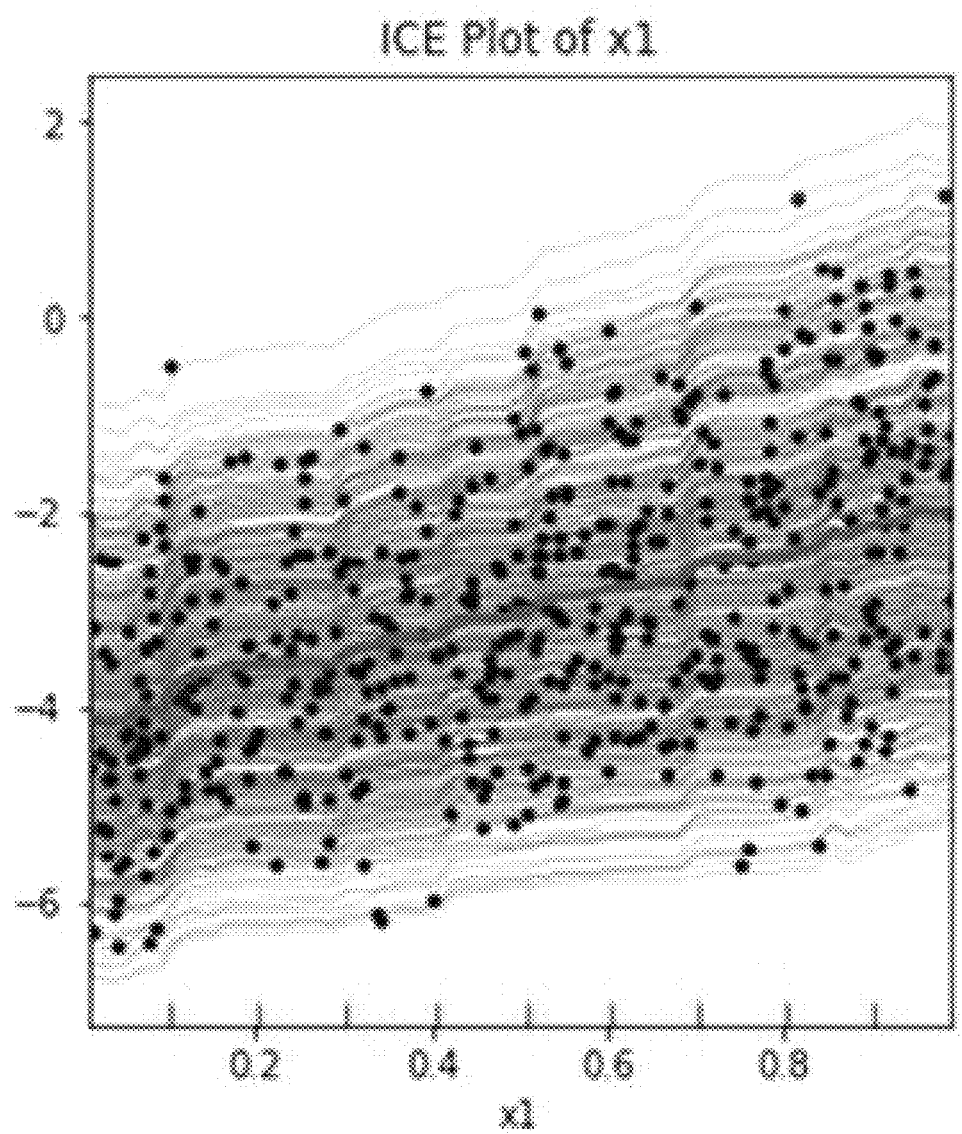
FIG. 6 provides an example illustration of an individual conditional expectation "ICE" plot in accordance with aspects of the innovation.
Figure 7:
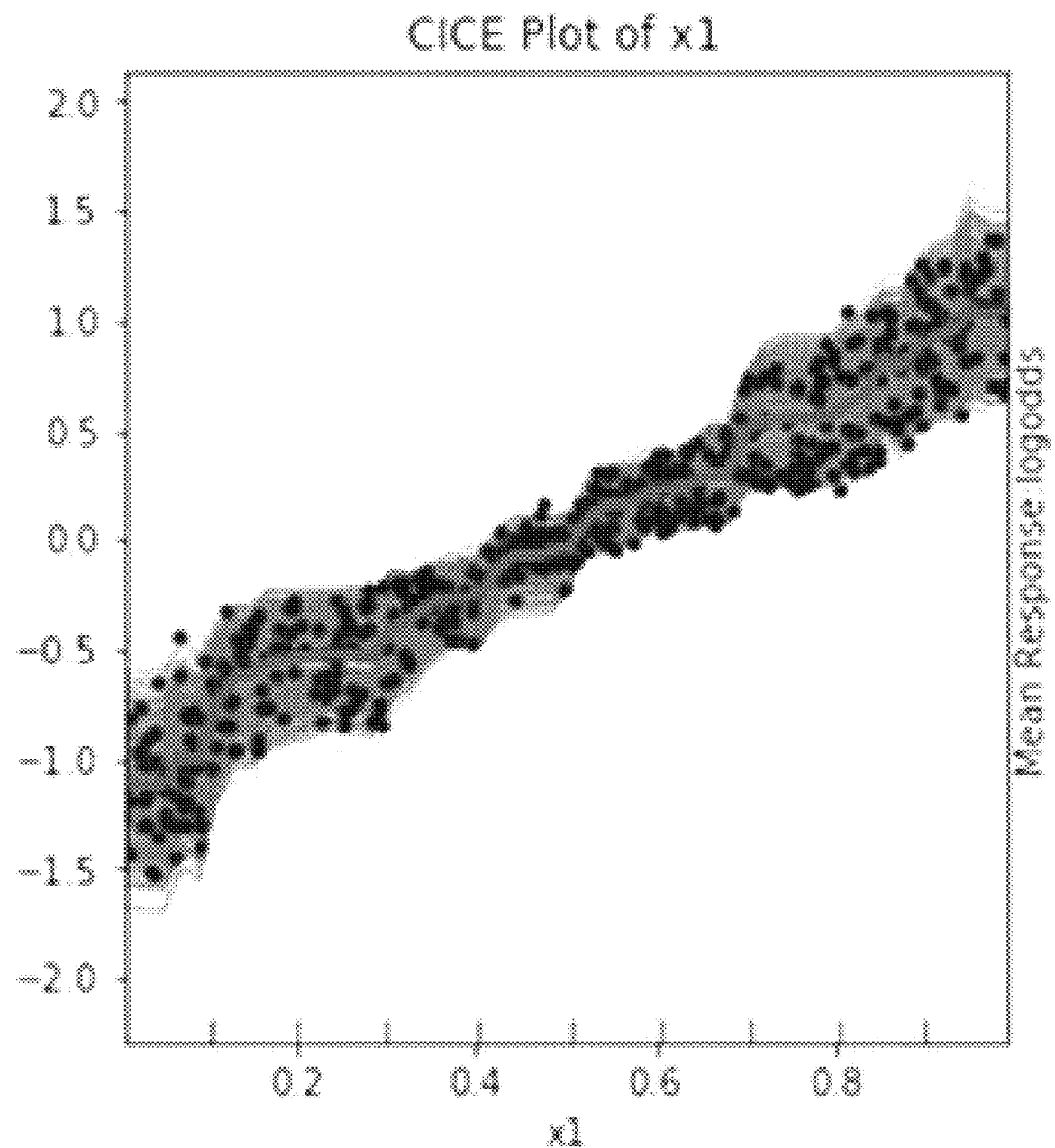
FIG. 7 provides an example illustration of a centered individual conditional expectation "CICE" plot in accordance with aspects of the innovation.
Figure 8:
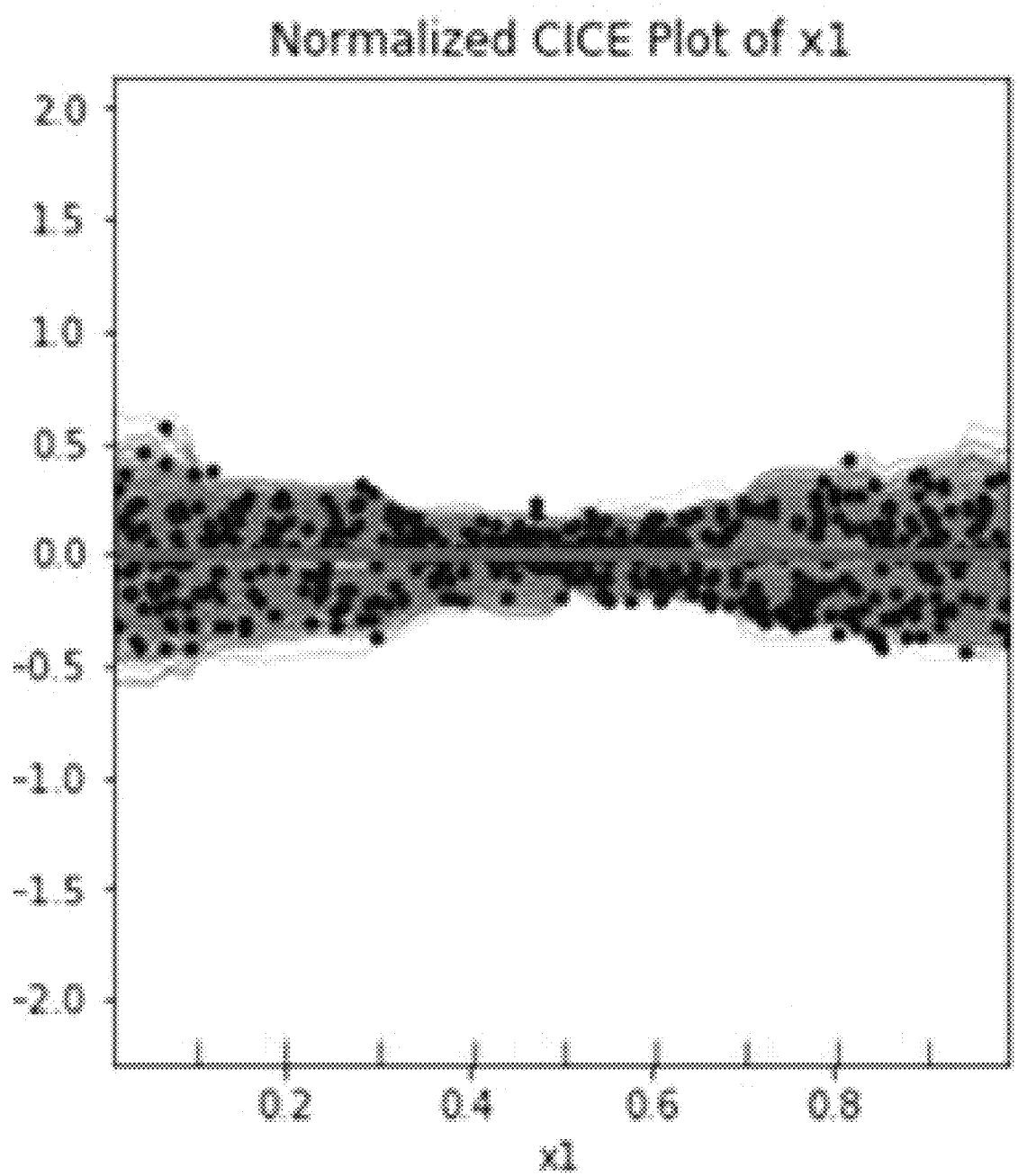
FIG. 8 provides an example illustration of a normalized CICE plot in accordance with aspects of the innovation.

FIGS. 6-8 provide examples of illustrations of ICE plot, centered ICE plot and normalized centered ICE plot for each variable respectively, where the red curves are partial dependent plots (PDP), centered PDP and zero curves, respectively. Total variance of data, total sensitivity, first order sensitivity and interaction sensitivity can be visualized by the variance of ICE plot, CICE plot, centered PDP and normalized CICE plot respectively. Such total effects, first order effects, and pure interaction effects may be obtained by ANOVA decomposition. It is to be appreciated that the following is a numerical implementation of ANOVA decomposition.

Total effect for $x_i$, i.e., an numerical approximation of $T_i$ $$\hat{T}'_i = \frac{1}{N}\sum_{n,k} w_k(M_{nk} - \overline{M})^2$$

and $\overline{M}$ is the weighted mean of $M_{nk}$ $$\overline{M} = \frac{1}{N}\sum_{n}\sum_{k} w_k M_{nk} = \sum_{k} w_k M_{.k}$$

The first order effect for $x_i$:

$$\hat{V}'_i = \sum_{k} w_k(M_{.k} - \overline{M})^2$$

Pure interaction effect where $x_i$ is involved:

$$\hat{U}_i = \frac{1}{N}\sum_{n,k} w_k(M_{nk} - M_{.k})^2$$

Additionally or alternatively, marginal plots may be used. When $$(E(Y|x)) = f(x) = f(x_1, \ldots, x_p),$$

a marginal function is.

$$f_j^M(x_j) = E(Y|x_j), j = 1, \ldots, p. \quad \text{Eq(5)}$$

This corresponds to modeling the response as a function of only the j-th variable. It is to be appreciated that techniques such as LOESS and regression splines for nonparametric regression can be used for the empirical estimation of $f_j^M(x_j)$.

Additionally or alternatively, ALE plots may be used. It is to be appreciated that ALE plots on their own are known in the art. Empirical versions may be used, such as, for example:

$$f_j^{ALE}(x_j) = \int_{z_{j,0}}^{x_j} E_{X_{-j}|X_j}\{f_j^1(X_j, X_{-j})|X_j = z_j\}dz_j$$

Where $$f_j^1(x_j, x_{-j}) = \frac{\partial f(x_j x_{-j})}{\partial x_j}.$$

Figure 9:
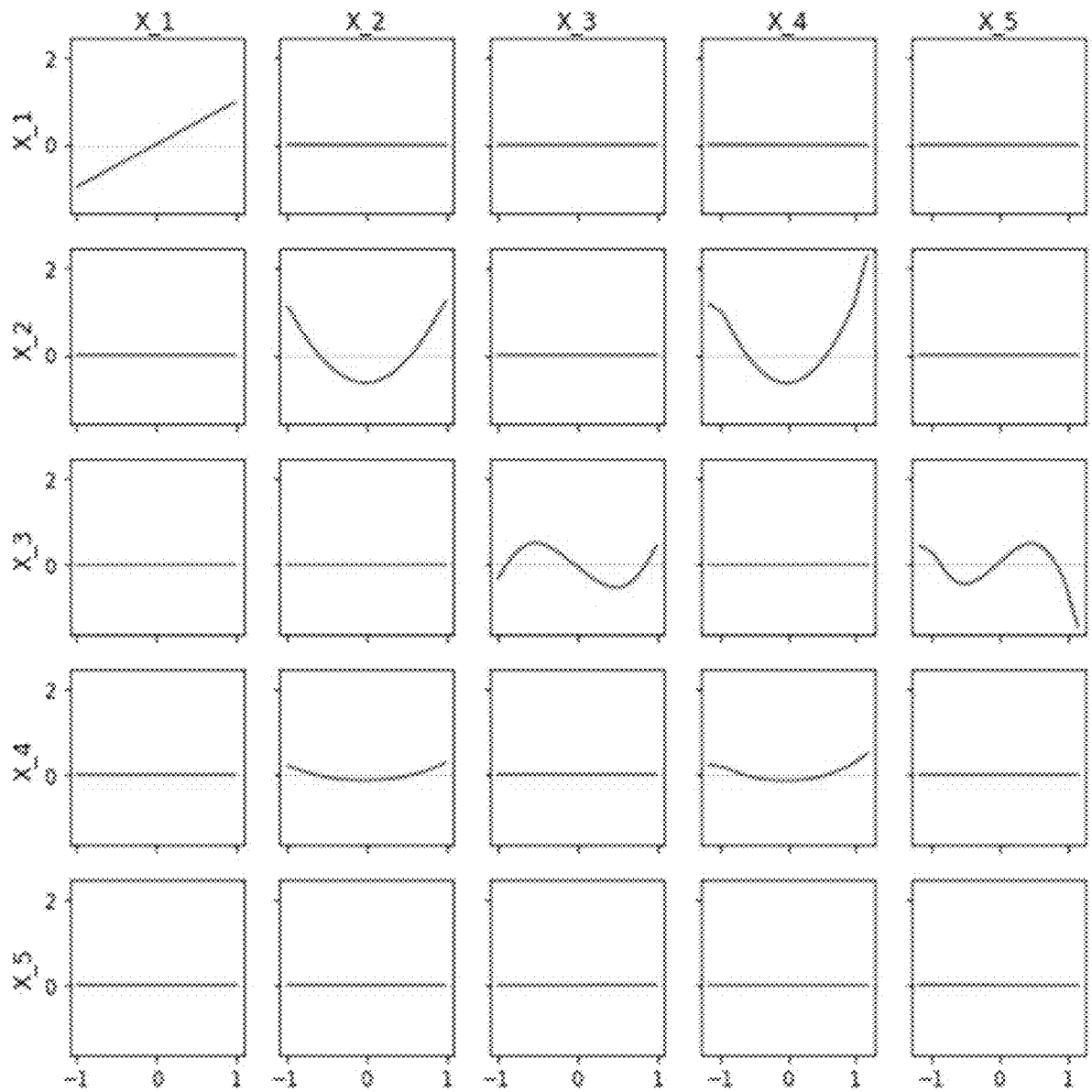
FIG. 9 illustrates an example accumulated total derivative effects "ATDEV" matrix plot in accordance with aspects of the innovation.

Turning to FIG. 9, illustrated is an example set of an ATDEV matrix plot. Additionally or alternately, ATDEV matrix plots may be used. Given p predictors in a regression model, a p×p matrix plot may be created as follows: The diagonal displays the centered 1-D ALE plots for j=1, . . . p. The off-diagonal terms, in row k and column j with j≠k, display the centered 1-D-ATE plots. If the off-diagonal plots are not null, two conclusions may be made: a) the two corresponding variables are dependent; and b) the row variable $x_k$ has a non-zero effect on the fitted response.

Figure 10:
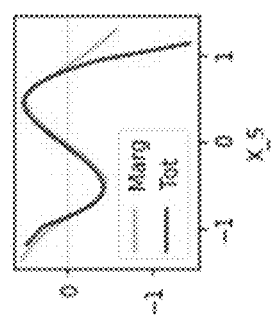
FIG. 10 illustrates an example overlay of ATDEV and marginal plots in accordance with aspects of the innovation.
Figure 10:
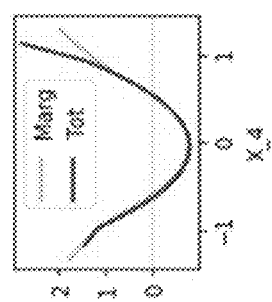
Figure 10:
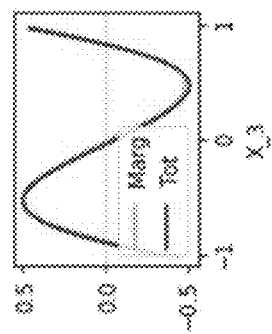
Figure 10:
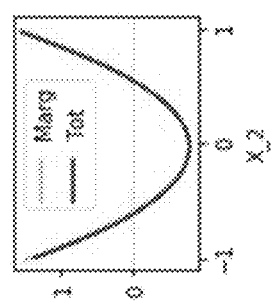
Figure 10:
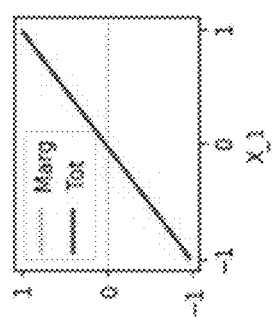

Turning now to FIG. 10, an additional or alternate embodiment may provide for an overlay of ATDEV and marginal plots. An estimation of a 1-D ATDEV plot may be obtained by adding up subplots in each column of an ATDEV matrix plot. The estimation of 1-D ATDEV plot is much more complicated as it is subject to approximation errors from derivative calculation and numerical integration, as well as possible biases from a misspecification of $m_k(x_j)$. One or more of these errors may cause a deviation of 1-D ATDEV plot from 1-D marginal plot empirically. Therefore, an overlay of centered 1-D ATDEV plot and centered 1-D marginal plot may be created for each variable in the model to confirm the estimation accuracy of 1-D ATDEV plot and the related matrix plot.

Figure 11:
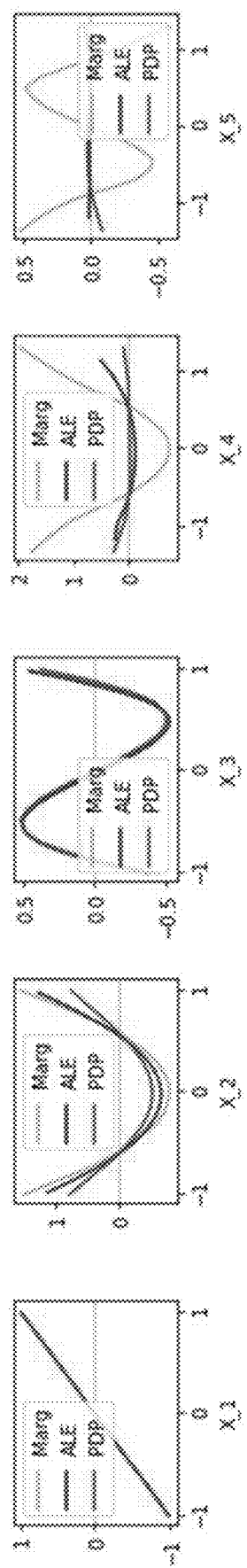
FIG. 11 illustrates an example overlay of partial dependence plot "PDP", accumulated local effects "ALE" and Marginal Plots in accordance with aspects of the innovation.

Turning now to FIG. 11, an additional or alternate embodiment may provide for an overlay of PDP, ALE and Marginal Plots. For each predictor in a model, the overlays of the 1-D PDP, marginal and ALE plots may be plotted, all centered to remove level differences from constant terms. The overlaid plots may provide a sense of overall data correlation, assisting identification of PDP extrapolation and related severity in particular instances. It is to be appreciated that 1-D marginal curves may be quite different from 1-D PDP and 1-D ALE in circumstances of correlations among predictors. As discussed herein, an observed overlap of PDP, marginal and ALE curves for a given variable may indicate for that variable that there is little correlation with other variables in the model. It is to be appreciated that the larger the difference between marginal and other two curve, the higher the correlation between the variable of interest and other variables. In circumstances in which a marginal plot does not overlap with the other two curves (i.e., sign of correlation), and there is a good overlap of 1-D PDP and ALE plots for a given variable, as discussed herein, the graph may indicate this variable's major contribution to the model is additive, and a possible extrapolation effect for PDP may be minimal despite the existence of a correlation. On the contrary, if PDP and ALE plots are far from each other, this may suggest either correlated interactions between the variable of interest and other variables, or that a PDP may be contaminated by extrapolations, or both. It is to be appreciated that extrapolation of PDPs may be further verified through the use of ICE plots. Once a correlation is identified for a certain predictor through the overlay of PDP, ALE and marginal plots, the correlation matrix may be used to check sources of correlation from different predictors, and ATDEV matrix plot may be used to check impact of individual correlations on a fitted response.

Figure 12A:
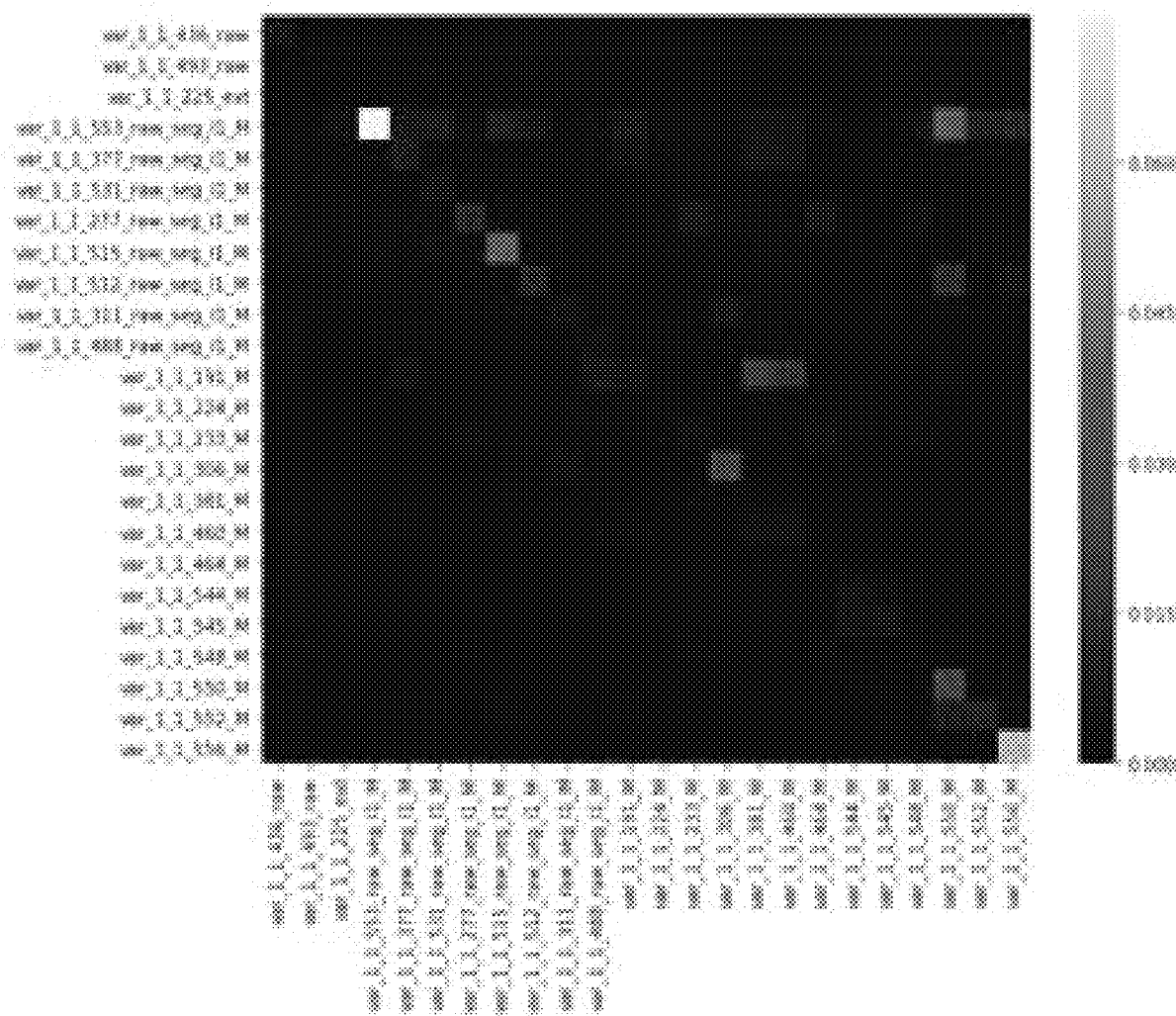
FIGS. 12A and 12B illustrate an example correlation matrix heat map in accordance with aspects of the innovation.
Figure 12B:
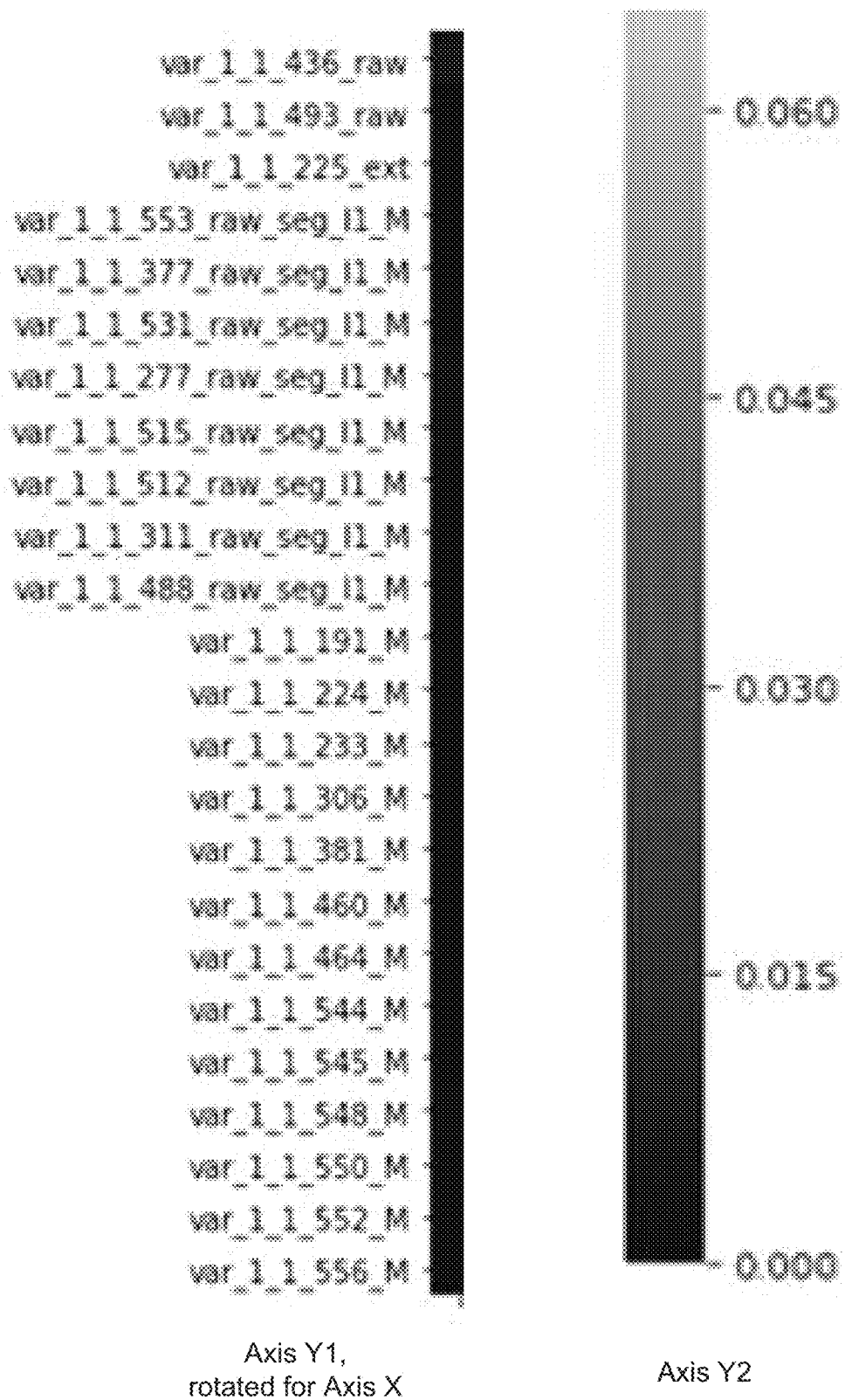
Figure 13A:
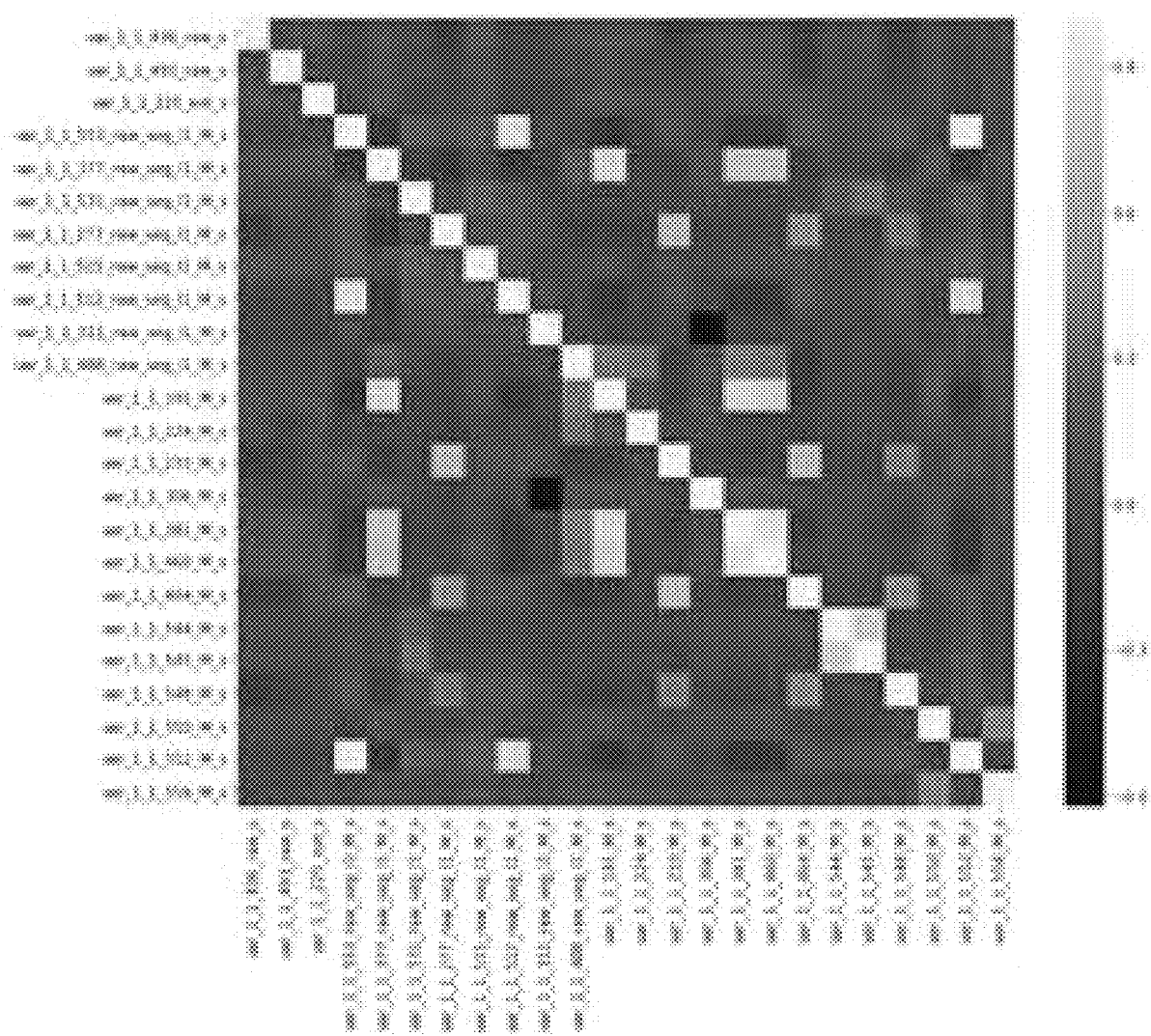
FIGS. 13A and 13B illustrate an example ATDEV decomposition heat map in accordance with aspects of the innovation.
Figure 13B:
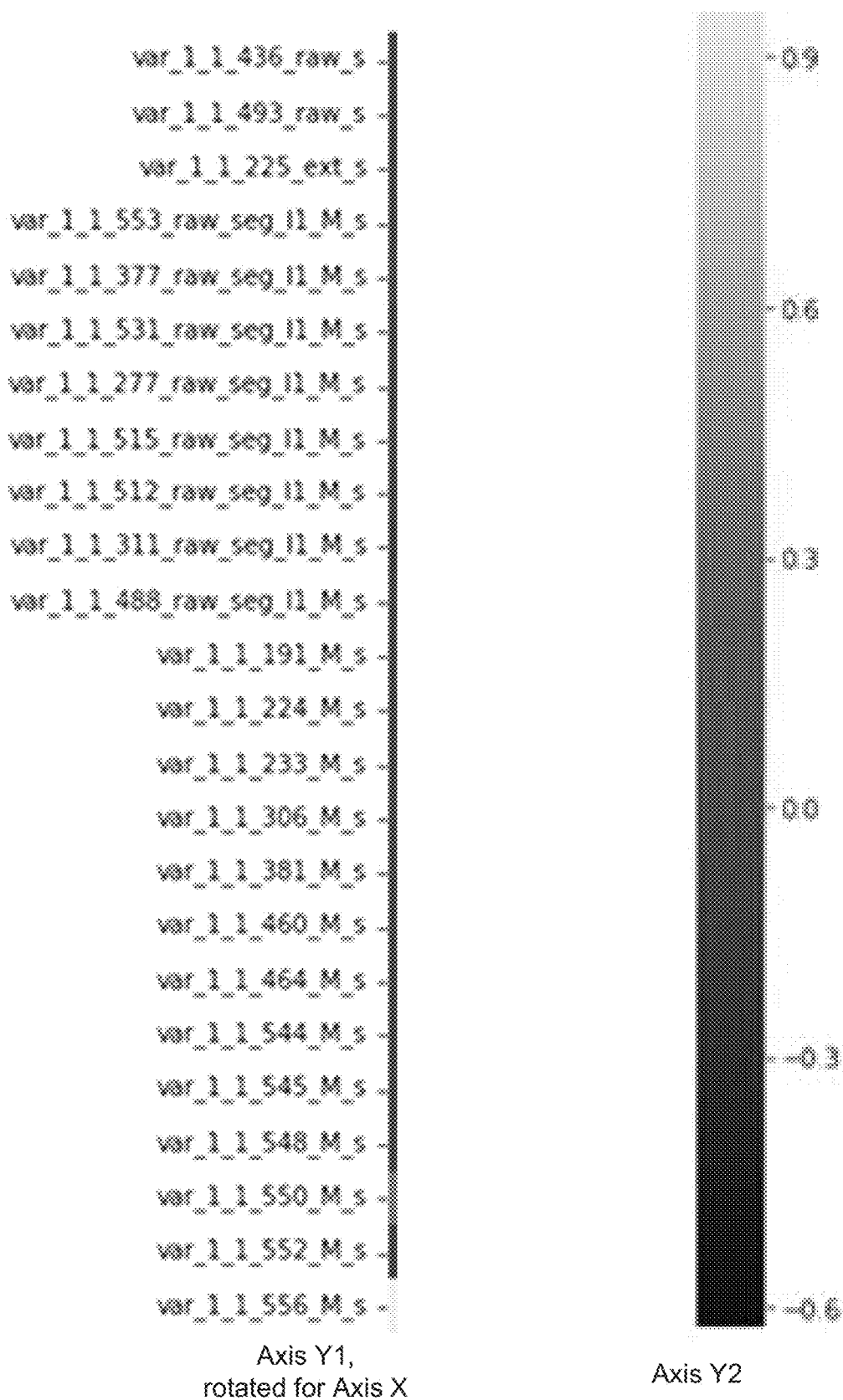
Figure 14:
FIG. 14 illustrates an aspect of ATDEV heat map components in accordance with aspects of the innovation.

Turning to FIGS. 12-14, a series of illustrations presenting aspects of Heat Maps of ATDEV Components are disclosed. It is to be appreciated that in some embodiments, a large dimension of one or more predictors p may provide difficulty in displaying a p×p ATDEV matrix plot with $p^2$ curves in total. Display improvements for such cases may be provided in one or more embodiments. In such embodiments, a matrix plot may be summarized into a heat map defined as follows to retain a more limited set of information, for example, a heat map may retain just primary information. It is to be appreciated that these one or more embodiments provide for computational improvements or display element savings or both and thus may be desired in some circumstances.

For a subplot (i, j) in an ATDEV plot matrix, variance $v_{ij}$ may be defined as a measure of the importance of a corresponding effect on a fitted response:

$$v_{ij} = \begin{cases} \text{Var}(f_i^{ACE}(x_1)), i \neq j \\ \text{Var}(f^{ALE}(x_1)), i = j \end{cases}$$

Each subplot thus may be represented by a single non-negative number, and a whole matrix may be replaced by a heat map, where brighter cells may be chosen to indicate higher levels of importance. In such an embodiment, the addition of $v_{ij}$ of each column, provides $v_{+j}$ corresponding to the ATDEV importance of each variable in a model. In an embodiment, $v_{kj}$ and $v_{+j}$ may be visualized through a heat map or a bar charts, as may be desired. It is to be appreciated that $v_{+j}$ is closely related to, but are not the same as, Sobol indices of $1^{st}$ order sensitivity defined with $\text{Var}(f_j^M(X_j))$.

It is to be appreciated that heat maps for a correlation matrix provide an easy to understand graphic. Such a map may display Pearson correlations between all predictor pairs. Properties of the heat map may include: (a) scaling between −1 and 1; (b) dark colors may be chosen to represent negative correlation and bright colors chosen to represent positive correlations; (c) since a correlation matrix is symmetric, the heat map will be symmetric as well.

While heat maps in general are not new, a heat map generated from a set of total derivative components is a new tool that provides somewhat different insights into dependence among predictors. It is to be appreciated that such a tool may be more useful in a regression context because the tool combines dependence (correlations) among predictors and their influence on the response. In an embodiment, a heat map may be based on a variance of ALE and ATE functions and may have the following properties: (a) a non-negative scale; (b) dark colors indicating no or little impact and bright colors suggesting high impact; (c) diagonal cells may represent individual marginal contribution of each predictor on a response (i.e., ALE); and (d) off-diagonal cells may represent a magnitude of cross marginal effect of a column variable on response transferred through a row variable (i.e., ATE). Thus, the diagonal cells of the heat map help to differentiate the effects of the predictors and identify ones with high individual contributions, and an off-diagonal cell which is not completely dark indicate the corresponding column variable has some impact on response through the intermediate row variable. As may be selected in an embodiment, brightness may be correlated with impact. For example, the brighter that a cell is, the higher a transferred impact may be.

Unlike the heat map for a correlation matrix, the new heat map may be asymmetric, since off-diagonal cells may depend not only on correlation but also on a magnitude of partial derivatives of a response surface with respect to a set of intermediate row variables, which can be different between the two variables of a pair, as disclosed herein, with a comparison summary between the heat map for a correlation matrix and the heat map of ATDEV components.

To continue in the embodiment for the heat map of ATDEV components, a "total brightness" in each column may indicate an overall "marginal" impact of each predictor on response. Further, the distribution of bright cells in each column may indicate different sources of such overall impact. It is to be appreciated that application of the insight from the tool may, for example be applied in variable selection. In variable selection, a preference may be to keep variables with a large overall marginal effect as well as large individual contribution (i.e., the bright diagonals). For example, if two variables have similar overall marginal brightness, the one with bright diagonal cell is more preferable in a model as its overall contribution comes mainly from itself and is less affected when its correlated variables may be removed from the model. By comparison, other candidate variable may rely more on a set of intermediate variables for its impact on a response. It is to be appreciates that a distribution of bright cells for such candidate column variable may be highly sensitive to samples and algorithms. Similarity to a "shared significance" phenomenon in linear regression for confounded variables may provide for an intuitive use of the tool. In an embodiment in which such candidate is removed from a model, it is likely that its contribution to response will be taken over by its correlated variables which may be still in the model. It is to be appreciated that such candidate may be considered less "important" than its counterpart with bright diagonal cells.

Examples show a correlation matrix heat map (FIGS. 12A and 12B) and an ATDEV decomposition heat map (FIGS. 13A and 13B) based on a home lending modeling data with 24 predictors. In this example, var553, var550 and var556 are good demonstrations of the disclosed innovation. They have similar "sum of brightness" scores in their corresponding columns, whereas var553 and var556 are much brighter than var550 in diagonal cells, indicating stronger individual 1-D effects. It is to be noticed that the brightness of several non-dark cells in the column of var550 varies across different runs of NN algorithms, indicating an instability of a shared significance due to variable correlations. On the other hand, var553 and var556's column patterns are more stable than that of var550, where the diagonal cell always dominates the column brightness, indicating stable individual contribution less affected by correlations.

Figure 15:
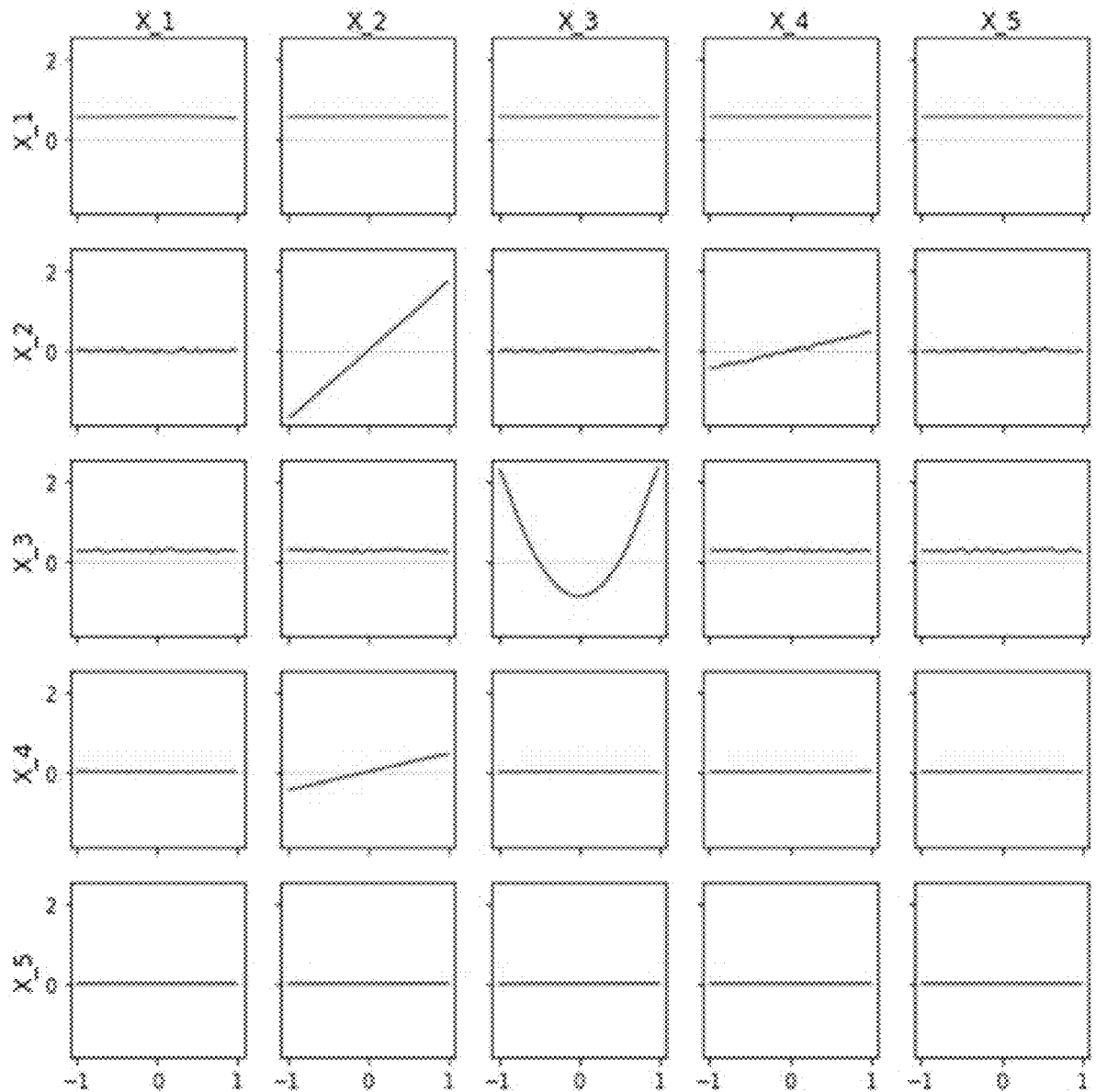
FIG. 15 provides an example local effect "LE" matrix plot in accordance with aspects of the innovation.
Figure 16:
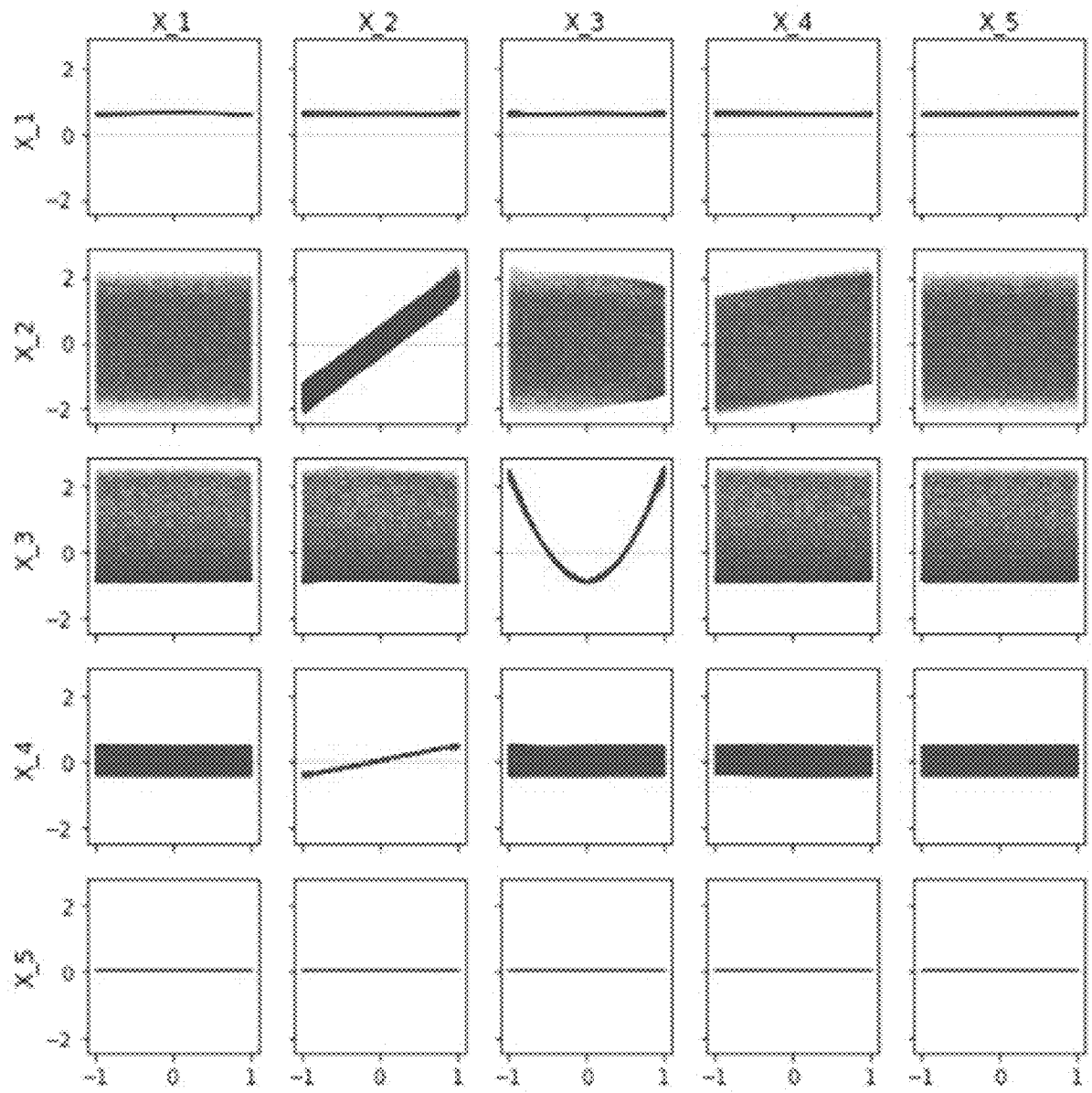
FIG. 16 provides an example additional or alternative manner in checking a scatterplot of partial derivatives before taking a conditional expectation in accordance with aspects of the innovation.

Turning to FIGS. 15 and 16, additional visualization tools for diagnostics according to embodiments of the innovation are presented. It is to be appreciated that matrix plots may provide a tool to show a variety of effects in dealing with parameters as being processed either globally or locally. Local effects, such as capturing interactions effectively when there is little dependency among the data can be particularly usefully captured in Local Effect (LE) matrix plots. These types of matrix plots may be created based on a conditional expectation of partial derivatives without integration (i.e., accumulation). Similar to 1D ALE plot, the diagonal subplots of LE plots show the individual contribution of $x_j$, but in derivative scale rather than response scale. Particularly useful indicators are the (k, j)th off-diagonal plots.

Additionally, as these plots are made without integration, they are more sensitive to most any small changes of response surfaces, and thus may be used as effective diagnostic tools to identify potential data or algorithm problems. In addition to calculating LE matrix plot, the sample points of partial derivatives may be leveraged in a number of different ways to facilitate comprehensive understanding of the black-box algorithms.

FIG. 15 provides an example LE matrix plot. In this example, since there is no correlation between any pair of the features, the diagonal subplots accurately capture the main effects of $x_1$, $x_2$ and $x_3$, and the off-diagonals also successfully capture the interaction between $x_2$ and $x_4$.

FIG. 16 provides an alternative manner in checking a scatterplot of partial derivatives before taking a conditional expectation. These plots show a similar story as suggested by LE matrix plot, but with more information from the distribution of sample points. For example, the off-diagonal subplots (2,4) and (4,2) are not symmetric. The subplot (4,2) has a strong and clear linear pattern because $f_4^1(x_4, x_{-4})$ =$0.8x_2$, which is a linear function of $x_2$, whereas subplot (2,4) is generated from $f_2^1(x_2, x_{-2})$=$3x_2+0.8x_4$, which is a function of both $x_2$ and $x_4$, and $x_4$ plays a minor role compared with $x_2$. That is why the linear pattern in subplot (2,4) is weaker.

Figure 17:
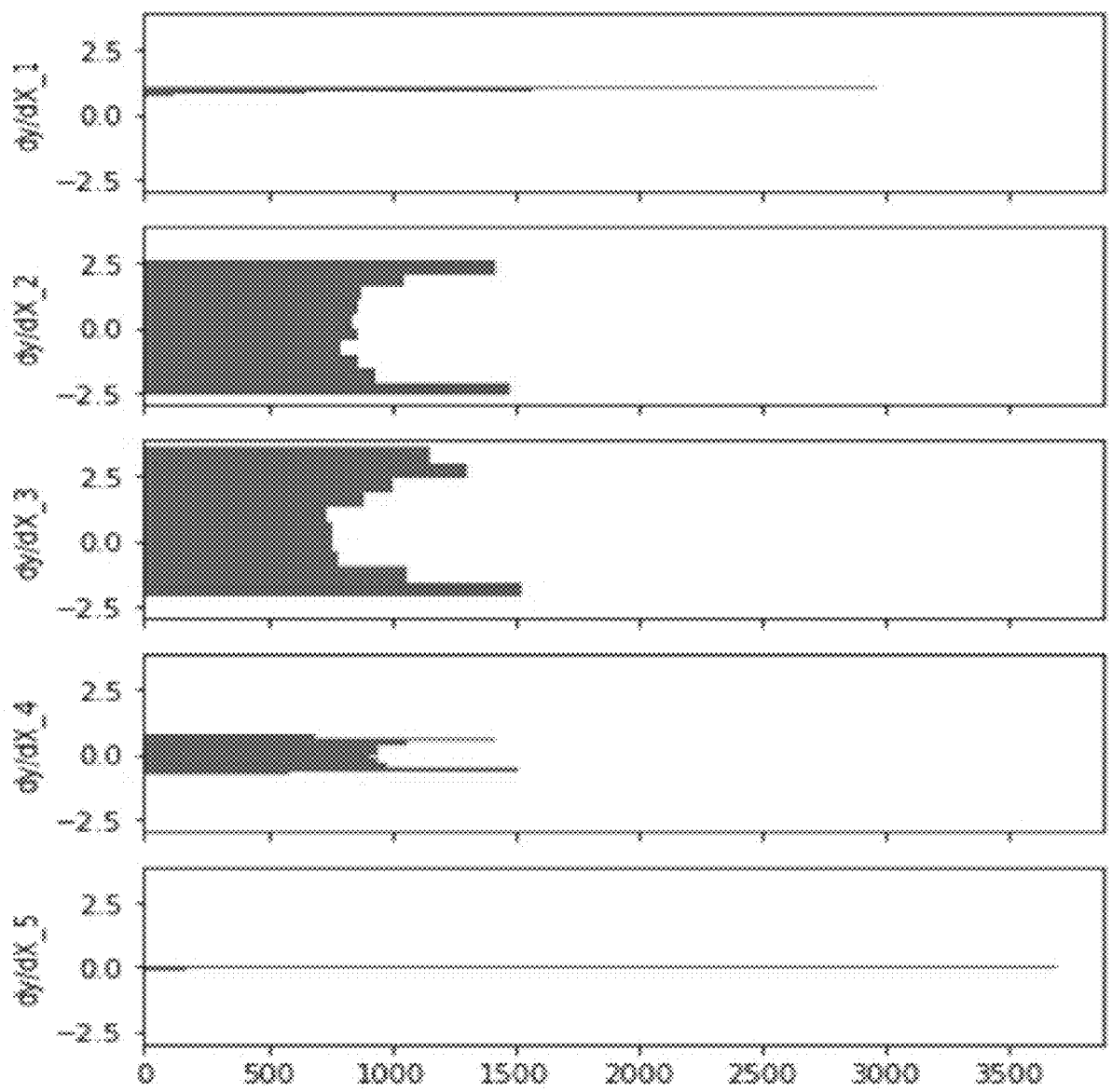
FIG. 17 provides an example visualization tool that may be constructed in accordance with aspects of the innovation.

Turning to FIG. 17, an example of another visualization tool that may be constructed in accordance with embodiments of the present innovation is portrayed. In this figure, a histogram is shown constructed based on sample points of partial derivatives $f_j^1(x_j, x_{-j})$ showing a distribution of the partial derivatives of the sample data. The use of a histogram may be applied to the results here, and it is in the context of the results, that the value of the histogram is realized.

Turning now to FIGS. 18-22, a discussion of variants of technology are presented in relation to embodiments of the present innovation. As discussed herein, local representation models may be based on (or adapted from) variants of LIME-SUP methodology. Local diagnostics may be aimed at interpreting a relationship between input variables and response variable in local regions in which the relationship can be well approximated by a simple parametric model locally. LIME as is known in the art, may simulate new instances around a chosen data point and explain a prediction by fitting a linear model in a neighborhood. As discussed herein, a variant of LIME called KLIME as is known in the art, uses K-means to partition an input space into K small local regions. Aspects of an embodiment of the innovation disclosed herein, may be referred to as LIME-SUP, and which uses supervised partitioning to group the predictor space. It is to be appreciated that this step may apply to either or both of continuous and binary responses. The innovation disclosed is robust and handles one, the other, or both. For continuous response, groupings may be fitted responses, and for binary response, groupings may be predicted probabilities or logits of fitted probabilities.

Additionally variants to a methodology known in the art as KLIME are to be understood as aspects of the present innovation. As understood in the art, KLIME may partition an input space into K partitions using clustering techniques (typically K-means) and then fit local models within each cluster. Since availability of KLIME is limited, the present innovation, in at least an embodiment, provides for implementation in new versions. It is to be appreciated that an embodiment may implement a new version by standardizing each of a set of predictor variables $\{X_1, \ldots, X_K\}$, and choosing a number of clusters K. For several common K-means clustering techniques, variations may be presented.

For example, usual K-means using Euclidean distance $d^2(x_i, x_j)$ $(x_i-x_j)^T(x_i-x_j)$ "KLIME-E". Another example may use Mahalanobis distance: $d^2(x_i, x_j)=(x_i-x_j)^T S^{-1}(x_i-x_j)$, where S is the sample variance-covariance matrix "KLIME-M". A further example may apply K-means after principle component analysis "PCA" where only the top principal components that account for at least 95% of variation are included "KLIME-P". In each example, each cluster may fit a linear model to the machine learning model predictions.

Figure 18:
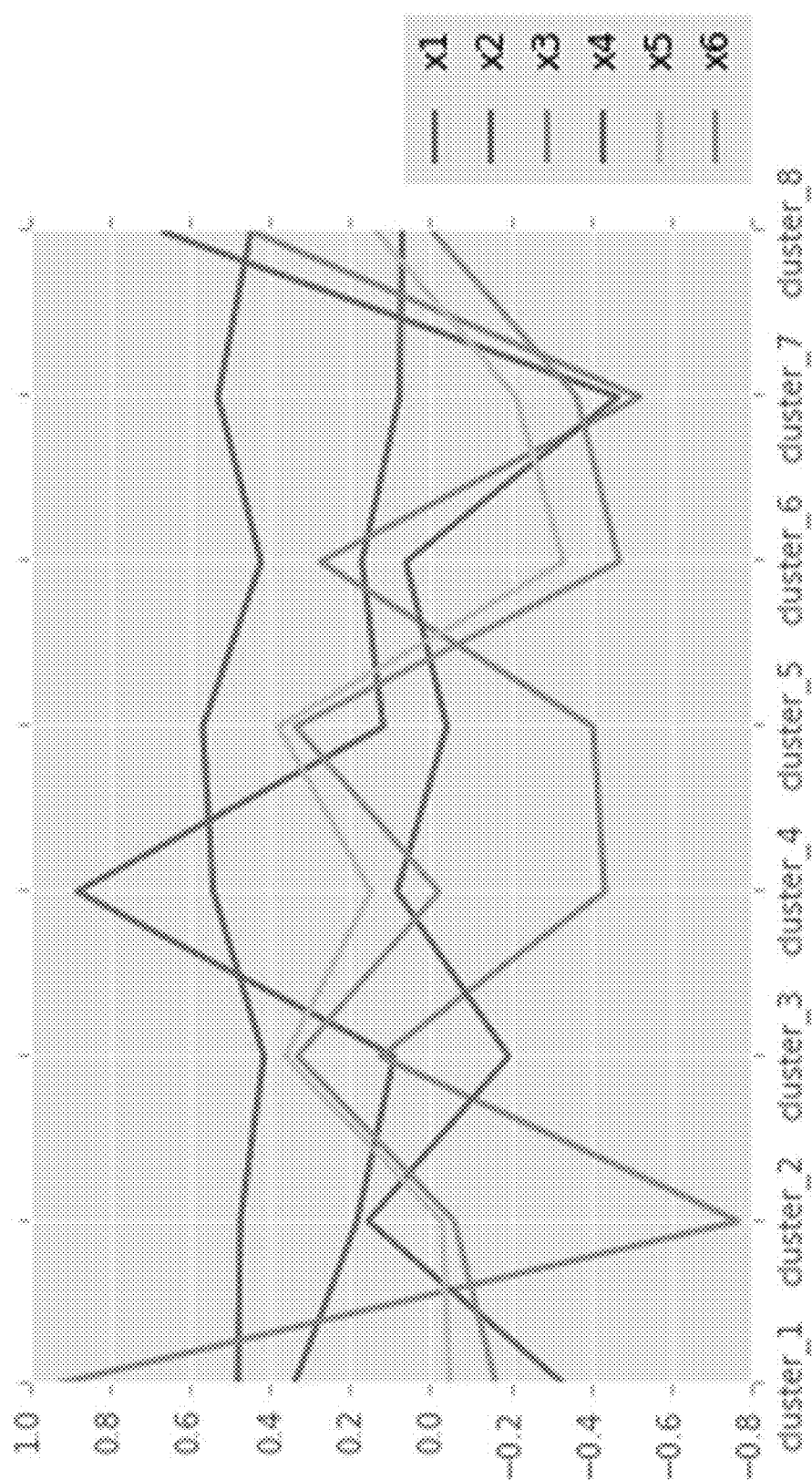
FIG. 18 provides an example plot of coefficients of local linear models in K-means partitioning locally interpretable models and effects using Euclidean distance "KLIME-E" in accordance with aspects of the innovation.

Turning to FIG. 18, coefficients of local linear models in KLIME-E may be plotted to view possible nonlinear or interaction effects. FIG. 18 provides a graph of coefficients of a KLIME-E with K=8, based on an example set of simulation data. It is to be appreciated that if a coefficient is not almost constant across the 8 clusters, it means there is some nonlinearity or interaction effects. In this example, $x_1$ is a linear term and it has almost constant coefficients, whereas $x_3$ is a quadratic term which has both positive and negative coefficients. Additionally, an overall fitness to an original machine learning model can be examined using MSE and $R^2$ as shown in Table 1. The $R^2$s are very high for the example KLIME models, indicating a good fit.

TABLE 1

Fit statistics for KLIME

|  | KLIME-E | KLIME-M | KLIME-P |
|---|---|---|---|
| MSE | 0.0681 | 0.0702 | 0.0647 |
| $R^2$ | 0.960 | 0.959 | 0.962 |

LIMESUP is similar to KLIME in that it also partitions the input space into small local regions and fit a simple parametric model in each region. However it differs in that it uses a set of machine learning predictions to supervise the partitioning (hence the name LIMESUP). Presented are two examples of LIMESUP implementations: LIMESUP-R and LIMESUP-D.

LIMESUP-R uses model based trees to partition an input space. Unlike usual decision tree algorithms, classification and regression tree "CART" for example, a model based tree fits a parametric model to each tree node instead of a constant. This provides the capability of fitting decently well even with a shallow tree depth. In an embodiment, machine learning predictions may be treated as our response, and are fit to a model-based tree. After the tree is fit, the tree structure may be plotted to reveal splits, and coefficients may be plotted to reveal any nonlinear or interaction effects. Additionally, fit statistics to the machine learning predictions may be calculated.

Figure 19:
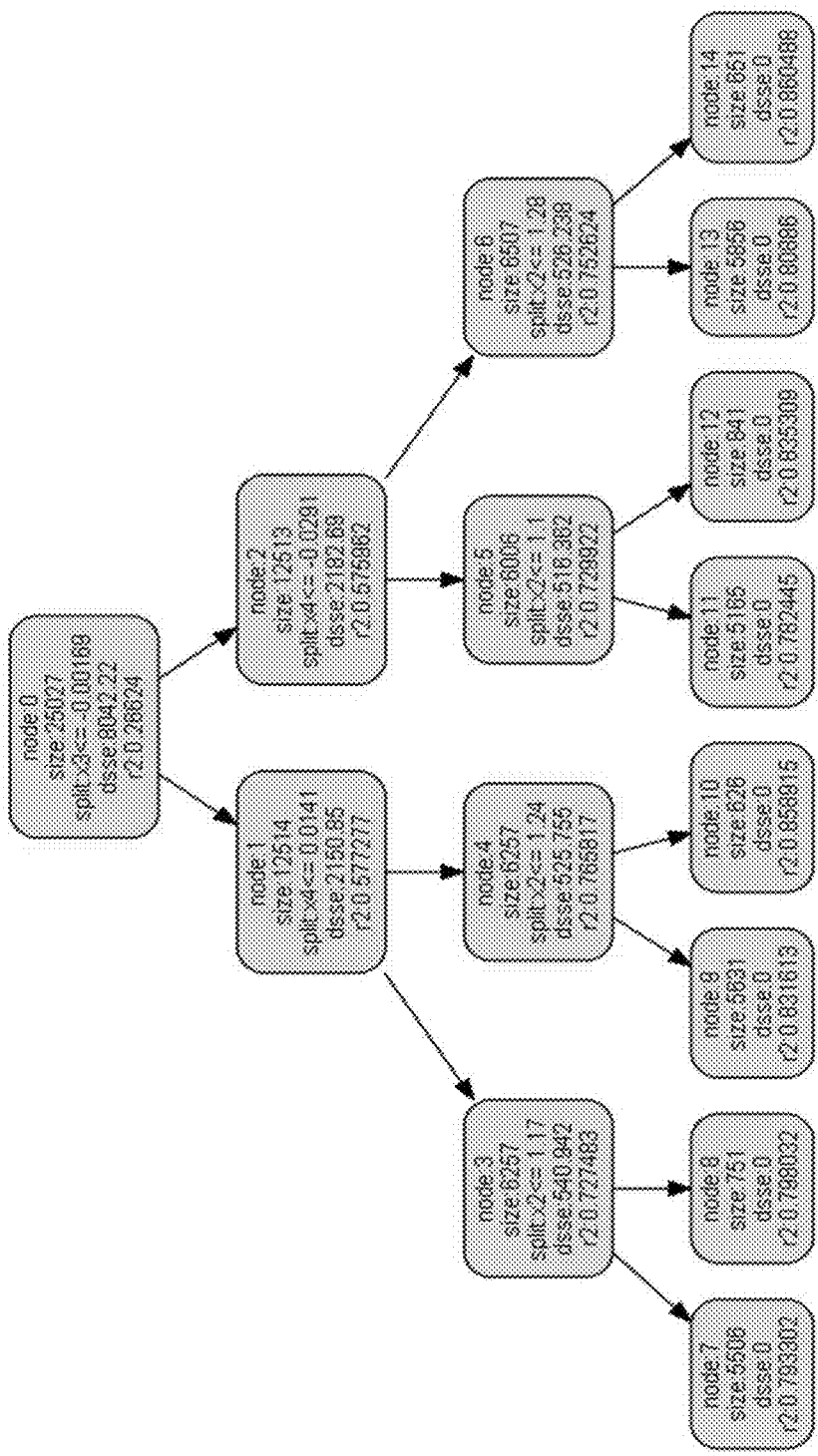
FIG. 19 presents a tree structure in accordance with aspects of the innovation.

FIG. 19 presents a tree structure and coefficients plot of LIMESUP-R for a simulation data. Model understanding may be facilitated by combining the tree structure and coefficients plot. For example, from the coefficients plot we can see the coefficients of $x_3$ are about 1 for nodes 7-10 and about −1 for nodes 11-14. The tree structure shows the nodes 7-10 are for $x_3 \leq 0$ and nodes 11-14 are for $x_3 > 0$, revealing that the difference in coefficients may likely be due to nonlinearity and not interactions. Similarly we can see the interaction between $x_4$ and $x_5/x_6$.

Figure 20:
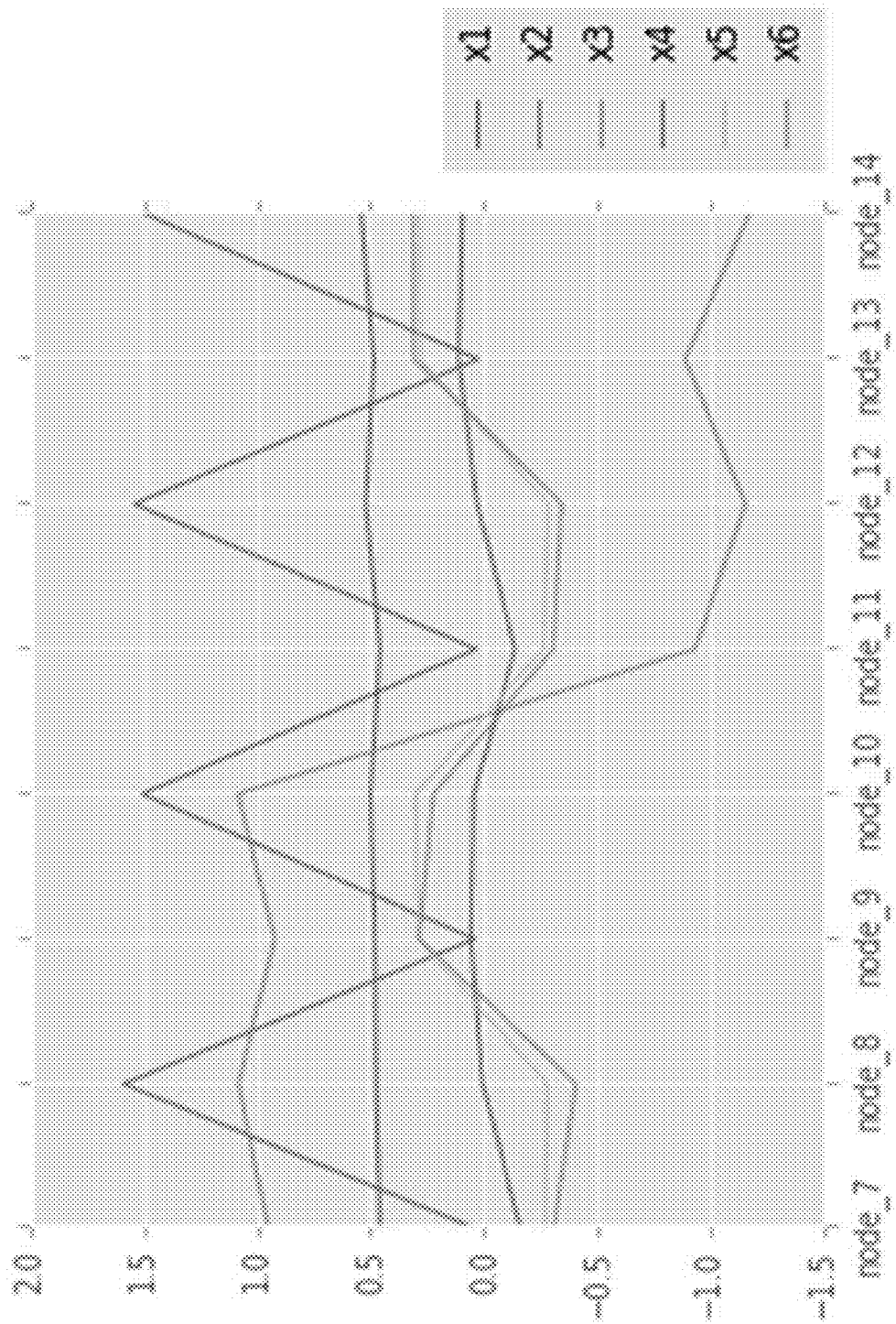
FIG. 20 presents an example coefficient plot for Locally Interpretable Models and Effects based on Supervised Partitioning (fitted response) "LIMESUP-R" in accordance with aspects of the innovation.

FIG. 20 presents coefficient plot for an example plot for LIMESUP-R. Table 2 provides fit statistics for the example LIMESUP-R. In this example, the $R^2$ is very high, indicating a good fit.

TABLE 2

Fit statistics for LIMESUP-R and LIMESUP-D

|  | LIMESUP-R | LIMESUP-D |
|---|---|---|
| MSE | 0.0429 | 0.0552 |
| $R^2$ | 0.975 | 0.967 |

Figure 21:
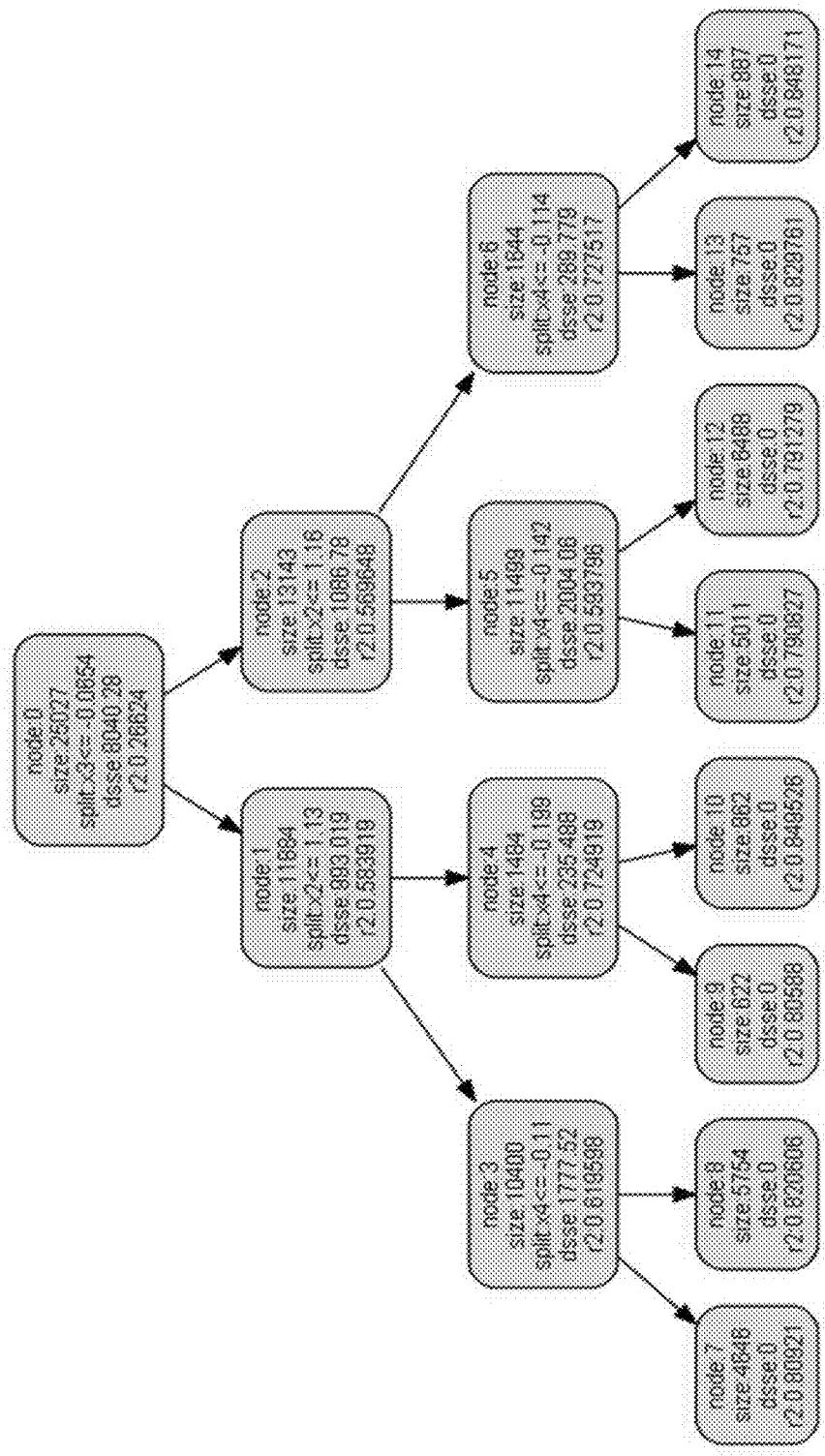
FIG. 21 presents an example tree structure in accordance with aspects of the innovation.
Figure 22:
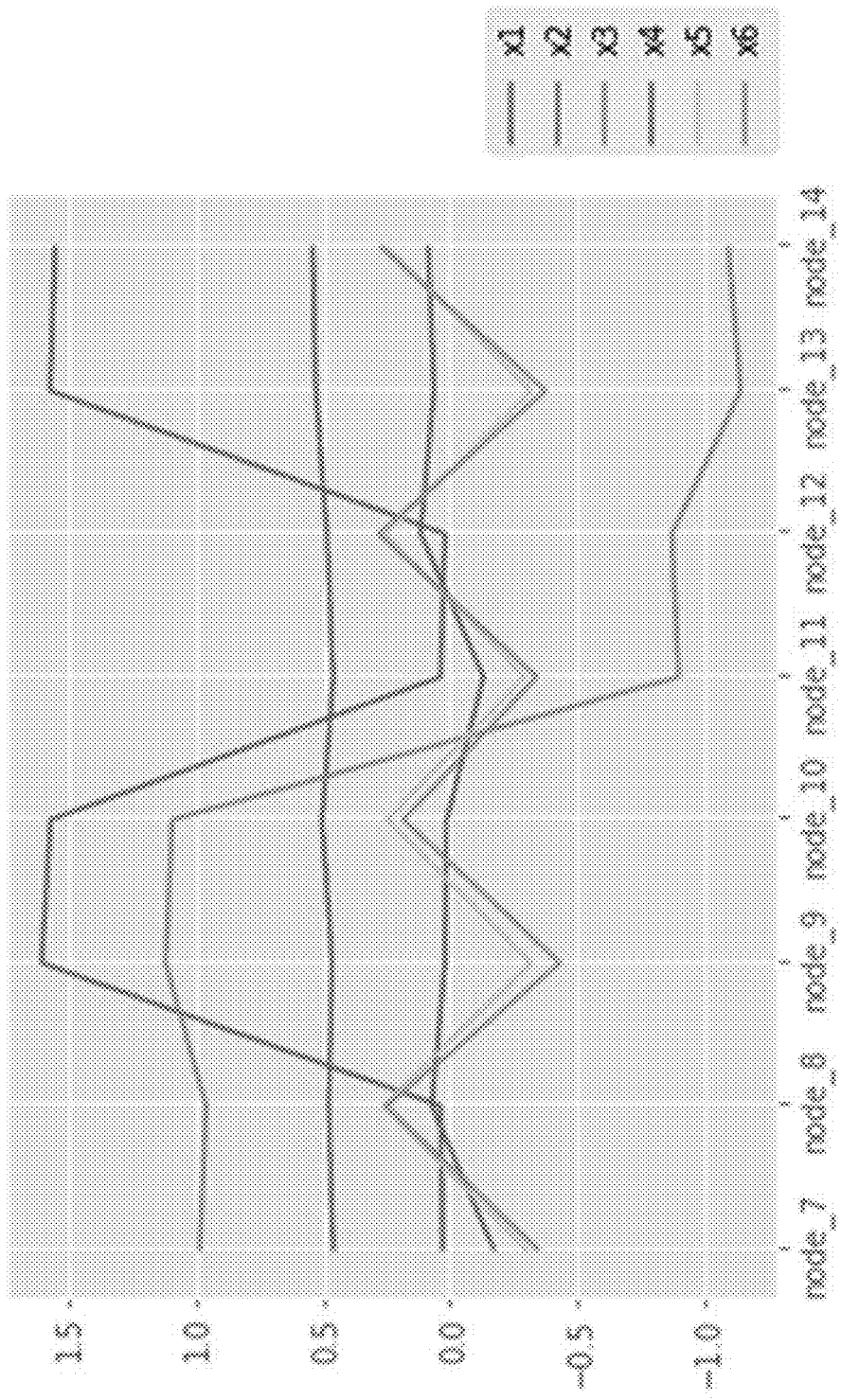
FIG. 22 presents an example coefficients plot of Locally Interpretable Models and Effects based on Supervised Partitioning (derivatives of fitted response) "LIMESUP-D" for a simulation data in accordance with aspects of the innovation.

FIGS. 21 and 22 illustrate an example LIMESUP-D that uses partial derivative information from a machine learning model. By treating the machine learning model as a complex function on the input space, f(X), partial derivatives through either numerical differentiation or fitting a neural network model may be obtained, and derivatives may be obtained using backpropagation. It is to be appreciated that derivatives are model coefficients for fitting local linear model to the machine learning model. Point-wise partial derivatives may be grouped to form a partition of the input space, so that within each group derivatives may be similar, which it is to be understood yields a linear model that will fit well. Partial derivatives may be used as multivariate response, and fit a regular decision tree algorithm using the predictors. Similar to the disclosure in relation to LIMESUP-R algorithm, a tree structure may be plotted, to view coefficients and fit statistics. FIG. 21 presents an example tree structure and FIG. 22 presents an example coefficients plot of LIMESUP-D for a simulation data and Table 2 shows the fit statistics for LIMESUP-D. Interpretations for this example are similar to the LIMESUP-R example.

Figure 23:
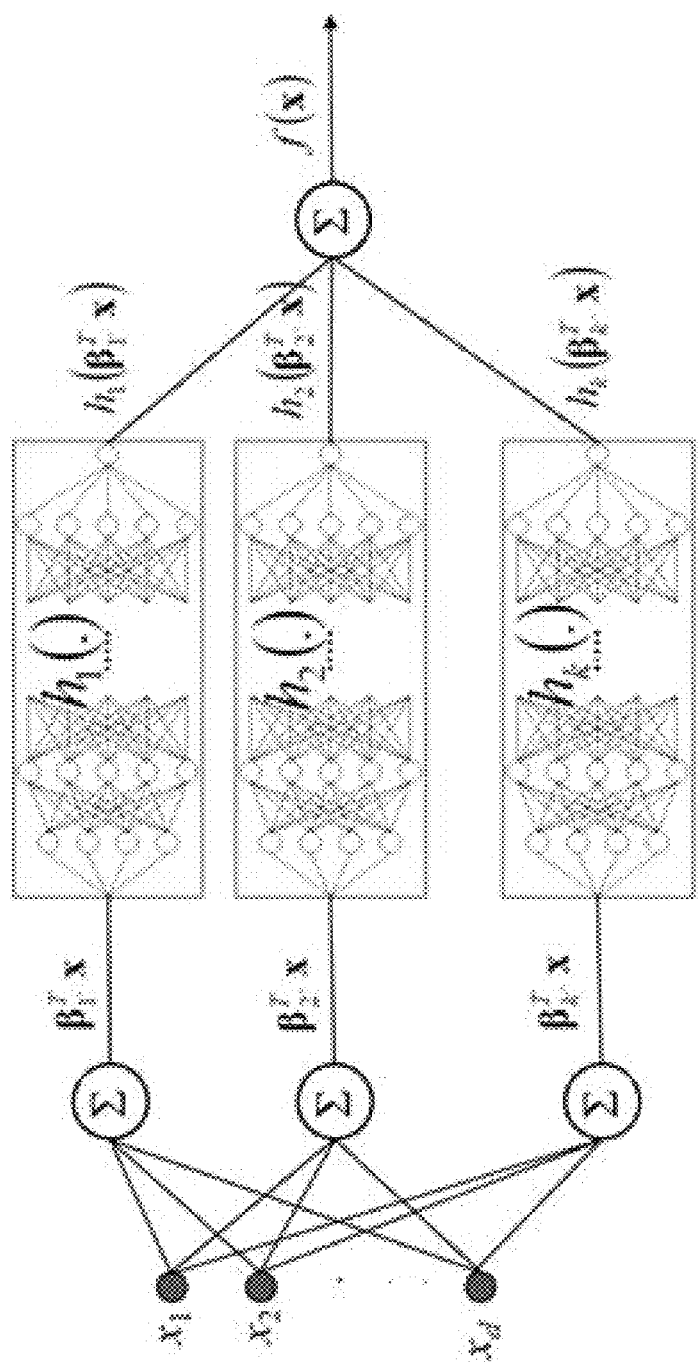
FIG. 23 provides an embodiment of a model explainable neural network "xNN" in accordance with aspects of the innovation.

Turning now to FIGS. 23-25, aspects of an embodiment of the innovation in relation to explainable neural network structured models (xNN) are explicated. FIG. 23 provides an embodiment of a model explainable neural network, a diagram of an xNN structure. The explainable Neural Network is a carefully structured neural network designed to be inherently interpretable. It is to be appreciated that typical feed-forward networks may learn a single, highly flexible function of the inputs by constructing a sequence of layers, in which the inputs of every node on a given layer are the outputs of the nodes on the previous layer. While the function may be flexible and may model very complex response surfaces, with such a model, it can be challenging or impossible to learn the relationships between the input variables and the model output. In contrast, the xNN limits connections in a network to create certain network structures, which may be combined to produce a network that estimates an interpretable model, given by the equation:

$$f(x)=h_1(\beta_1^T x)+h_2(\beta_2^T x)+ \ldots +h_K(\beta_K^T x)$$

In this model, the relationships between the inputs (x) and outputs (f(x)) may be clearly traced, due at least in part to features such as each ridge function, $h_i(\cdot)$, having univariate input and output, and may be easily visualized via a graph, and features such as input to each ridge function, $\beta_i^T x$, being a linear combination of the input variables. By building the model from such relatively simple structures, the capture and explanation of relationships between input and output may be facilitated.

An xNN model may be achieved using two important structures. First are projection nodes, which are simply artificial neurons with linear activation functions. Typically, linear activation functions are not popular in modern neural networks, as they do not allow the network to learn nonlinearities, but here they may be used to provide interpretability. Projection nodes are shown by a Σ in FIG. 23. A second important component is a subnetwork, a structure that internally is a fully connected neural network with nonlinear activation function, but externally has only a single (univariate) input, and a univariate output. In an embodiment, there are no other connections between projection nodes other than subnetworks, while within subnetworks, traditional networks which may comprise complex machine learning elements may exist. Subnetworks provide a flexible way to learn appropriate ridge functions, which are shown by the blue boxes of nodes in FIG. 23. Such a network as its own set may be constructed using lower-level functionality as known in the art, the network may be trained on data using stochastic gradient descent, or other variants known in the art.

Figure 24A:
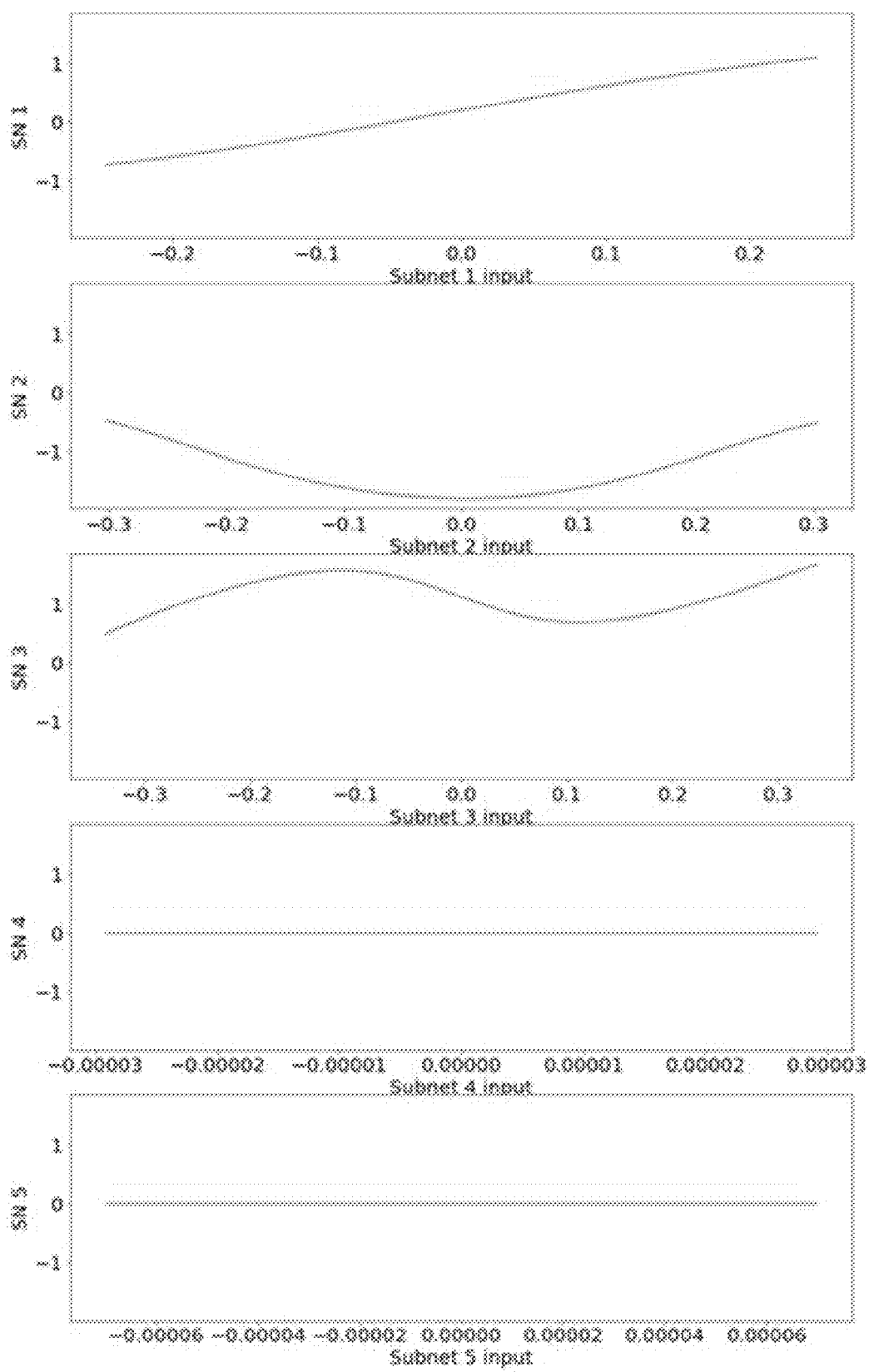
FIGS. 24A and 24B provide an example visualization in an embodiment in accordance with aspects of the innovation.
Figure 24B:
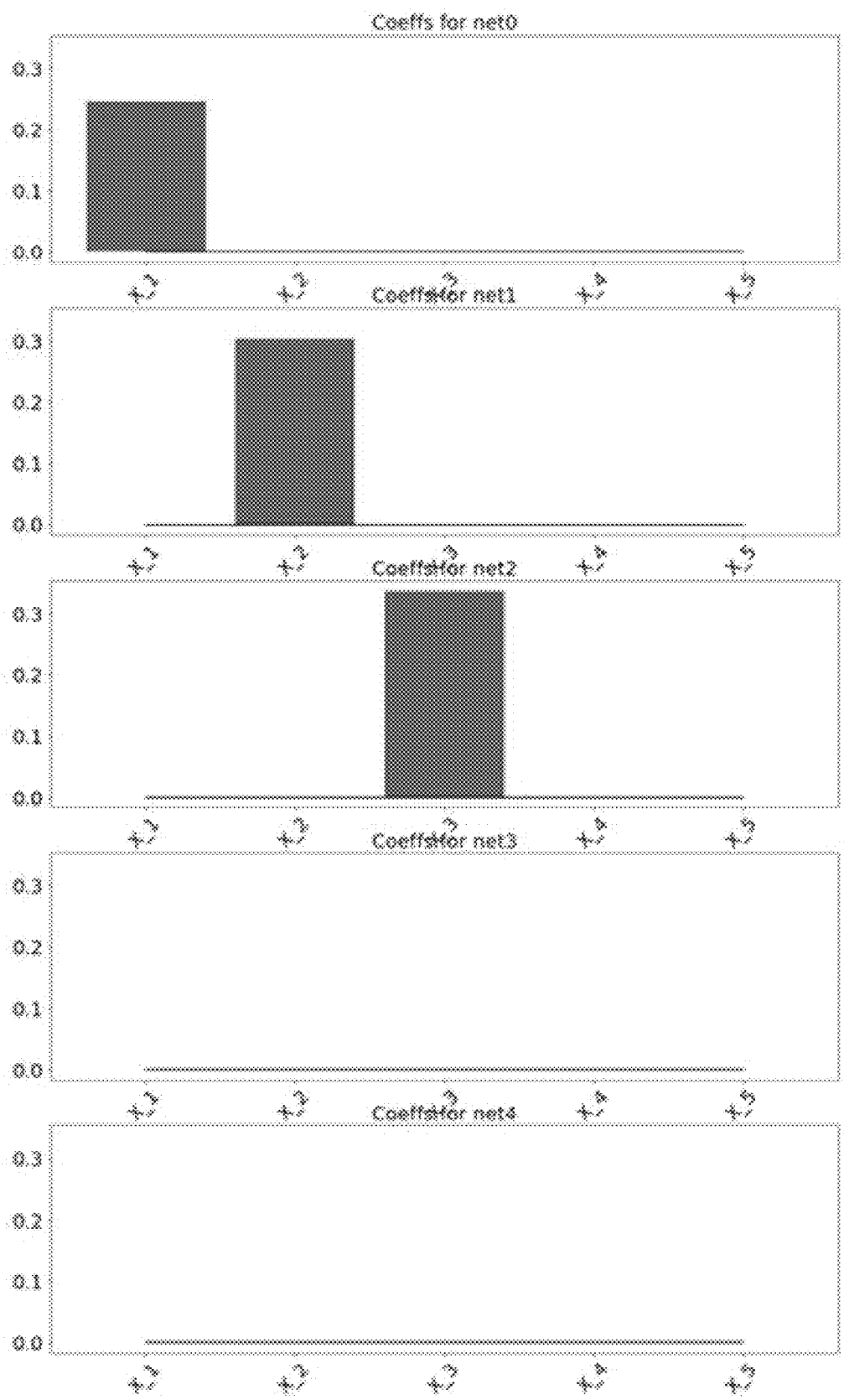

It is to be appreciated that one of the advantages of the disclosed innovation is that interpretability tools of the xNN provide an ability to extract relevant components of a network for visualization. FIGS. 24A, 24B, 25A and 25B provide example visualizations in an embodiment. In FIGS. 24A and 24B, each row represents a subnetwork. The first column shows the function learned by that subnetwork, which is easily visualized. The second column shows a corresponding linear combination of variables that serves as input to each network.

Figure 25A:
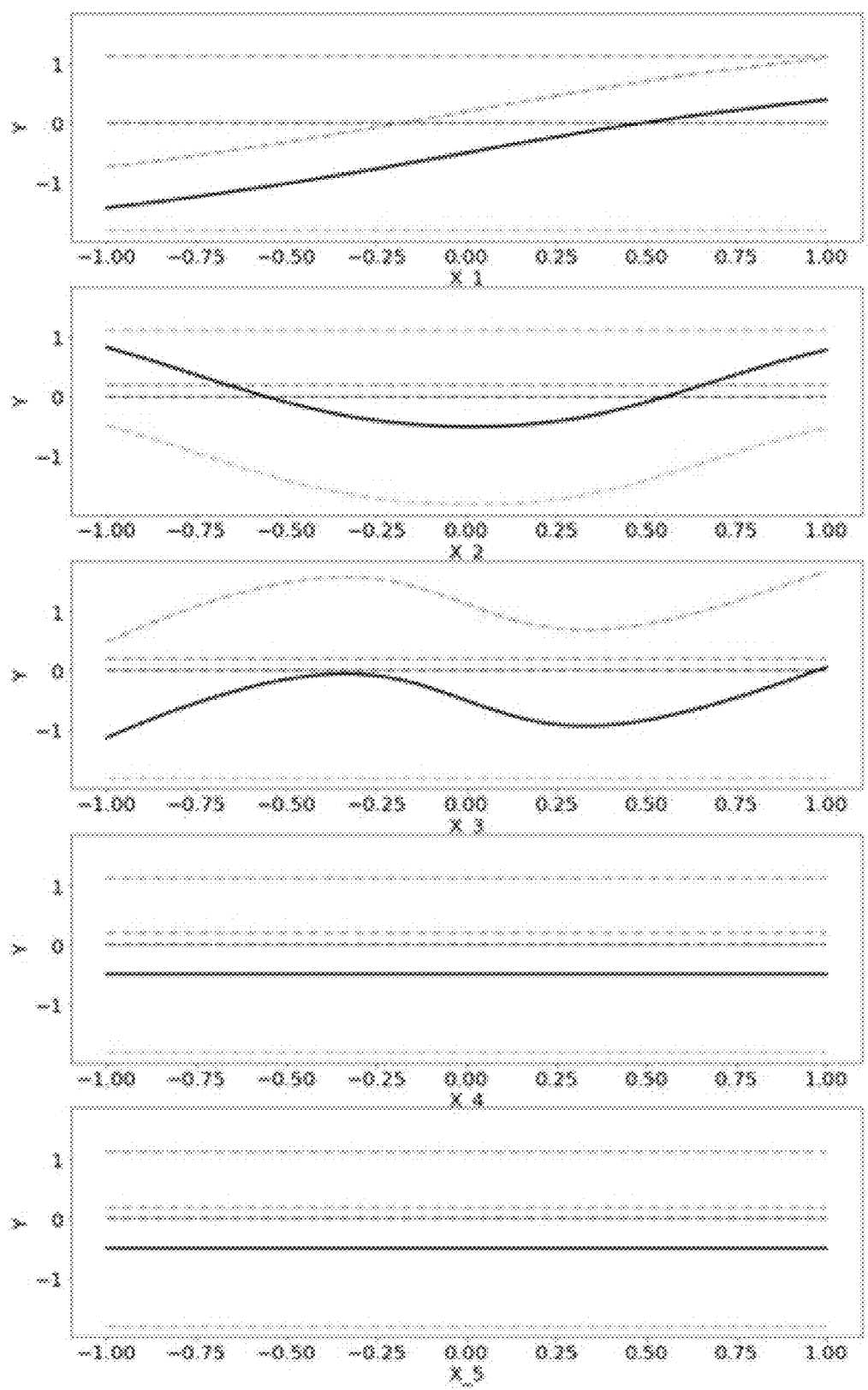
FIGS. 25A and 25B provide an example visualization in an embodiment in accordance with aspects of the innovation.
Figure 25B:
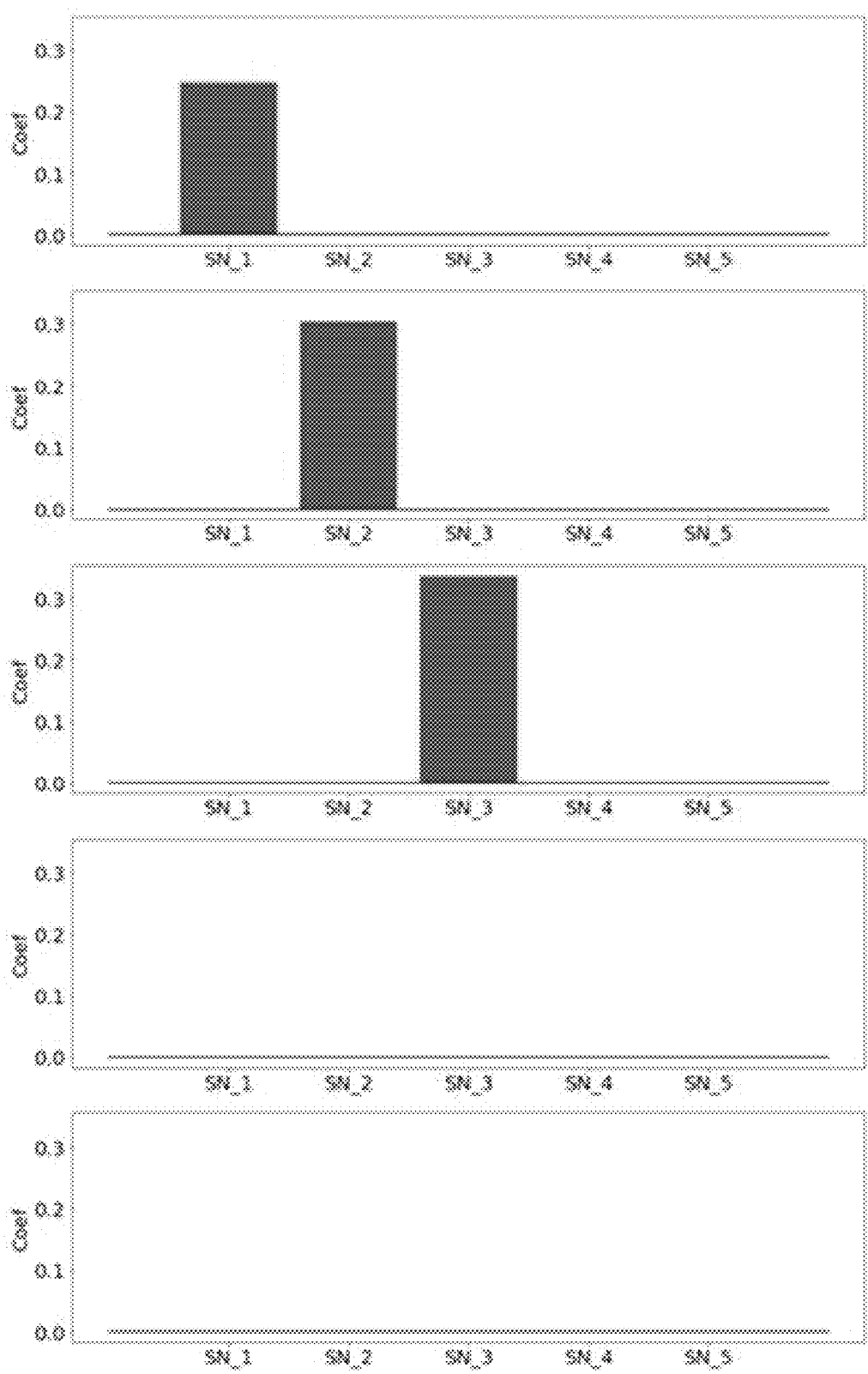

FIGS. 25A and 25B provide an example visualization in accord with aspects of the disclosed innovation. Particularly, a trained xNN may also be visualized with respect to each of a set of input variables to visualize univariate effects: In the figure, each row corresponds to a variable. In the first column, conditional effect of each subnetwork on that variable is shown with dotted lines. Aggregate conditional effects of a network on that variable when the effects of all subnetworks are combined are shown in bold. In the right column, coefficient of the variable in each of the subnetworks is shown. It is to be appreciated that this illustrates relative importance for the networks for a given input variable.

Although, in accordance with some aspects, the subject matter has been described herein in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has, "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. For features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system comprising:
    a replicator that employs Locally Interpretable Models and Effects based on Supervised Partitioning (LIME-SUP) techniques on a plurality of machine learning-models, comprising at least one machine learning model with opacity issues that include a black box effect, to create a replicated semi-additive index data structure that provides local and global explainability for the black box effect,
    wherein the replicator communicates with a library of interpretable machine learning models, and wherein the created replicated semi-additive index data structure is a neural network based formulation of an additive index model where a neural network of the neural network based formulation is a replicated structured neural network that is trained using mini-batch gradient-based methods, and wherein the black box effect is a non-visible operation, of the at least one machine learning model with the opacity issues, that lacks explainability;
    a translator module that generates a score and a plurality of sub-scores based on the created replicated semi-additive index data structure, wherein generating the score involves ranking a relative effect of a disparity to a plurality of elements of the created replicated semi-additive index data structure, wherein the ranking comprises ranking relative importance of a decomposed effect of the disparity, wherein the score is indicative of a match status to the at least one machine learning model with the opacity issues; and
    a graphical user interface that renders selected characteristics of the created replicated semi-additive index data structure to produce a rendering that depicts the local and global explainability for the black box effect of the at least one machine learning model with the opacity issues.

2. The computing system of claim 1, wherein the replicated structured neural network has a tree structure with coefficients derived from the LIME-SUP techniques.

3. The computing system of claim 1, wherein the rendering comprises at least one of an Individual Conditional Expectation (ICE), Centered Individual Conditional Expectation (CICE), or Normalized CICE plot, and wherein the at least one of the ICE, CICE, or Normalized CICE plot provides a diagnostic for observed values of the at least one machine learning model with the opacity issues.

4. The computing system of claim 3, wherein the diagnostic provides a simplification for data oversize with a drawing of paths fora subset of random samples.

5. The computing system of claim 3, wherein:
in an instance where the rendering comprises the CICE plot, the diagnostic provided for the observed values comprises a total sensitivity of a variable $X_i$, and
in an instance where the rendering comprises the Normalized CICE plot, the diagnostic provided for the observed values comprises an interaction sensitivity for the variable $X_i$.

6. The computing system of claim 1, wherein the rendering comprises an Accumulated Total Derivative Effects (ATDEV) matrix plot that provides, for off-diagonal non-null sets, an indicator of dependence of corresponding variables and non-zero effects of a fitted response to the at least one machine learning model with the opacity issues.

7. The computing system of claim 6, wherein the rendering further comprises an overlay of an ATDEV one dimensional plot that is generated from columns of the ATDEV matrix plot with a one-dimensional marginal plot, and wherein diagnostics for the ATDEV matrix plot is configured to confirm estimation accuracy.

8. The computing system of claim 7, wherein:
the rendering further comprises at least one of an ATDEV component heat map and correlation heat map that compensate for a large dimension of one or more predictors related to the at least one machine learning model with the opacity issues,
the at least one of the ATDEV component heat map and the correlation heat map provide an importance measure of a corresponding effect on the fitted response related to the at least one machine learning model with the opacity issues, and
the ATDEV component heat map comprises a simplification of the ATDEV matrix plot, and the correlation heat map provides a measure of Pearson correlations between a plurality of sets of predictor pairs related to the at least one machine learning model with the opacity issues.

9. The computing system of claim 1, wherein the rendering comprises a centered overlay of Partial Dependence Plot (PDP), Accumulated Local Effects (ALE), and marginal plots that provides a plurality of variable to variable correlation effects, wherein a subset of the plurality of variable to variable correlation effects provides an indication that a selected variable's model contribution is additive and another subset of the plurality of variable to variable correlation effects provides an indication of a level of extrapolation effects.

10. The computing system of claim 1, wherein construction of the replicated semi-additive index data structure comprises using derivative-based analysis techniques used by the additive index model without having to rely on finite difference approximations.

11. A computing system comprising:
a replicator that employs Locally Interpretable Models and Effects based on Supervised Partitioning (LIME-SUP) techniques on a plurality of machine learning models comprising at least one machine learning model with opacity issues that include a black box effect, wherein the replicator communicates with a library of interpretable machine learning models to create a replicated semi-additive index data structure that provides local and global explainability for the black box effect, wherein the black box effect is a non-visible operation, of the at least one machine learning model with the opacity issues, that lacks explainability, wherein the replicated semi-additive index data structure is a neural network based formulation of an additive index model where a neural network of the neural network based formulation is a replicated structured neural network that is trained using mini-batch gradient-based methods;
a translator module that generates a score and a plurality of sub-scores based on the created replicated semi-additive index data structure, wherein generating the score involves ranking a relative effect of a disparity to a plurality of elements of the created replicated semi-additive index data structure, wherein the ranking comprises ranking relative importance of a decomposed effect of the disparity, wherein the score is indicative of a match status to the at least one machine learning model with the opacity issues; and a graphical user interface that renders selected characteristics of the created replicated semi-additive index data structure to produce a rendering that depicts the local and global explainability for the black box effect of the at least one machine learning model with the opacity issues.

12. The computing system of claim 11,
wherein the replicated structured neural network is comprised of a plurality of projection nodes and a plurality of subnetworks, and
wherein the replicated structured neural network is limited, while the replicated semi-additive index data structure is created, to a structure of the plurality of projection nodes and the plurality of subnetworks, and the plurality of subnetworks have previously been mapped to the library of interpretable machine learning models.

13. The computing system of claim 12, wherein the plurality of projection nodes comprise artificial neurons with a plurality of linear action functions.

14. The computing system of claim 12, wherein the plurality of subnetworks comprise a ridge function that comprises an internal structure of a fully connected neural network with nonlinear activation function and an external structure of a univariate input and a univariate output.

15. A non-transitory computer readable medium having instructions to control one or more processors configured to:
employ Locally Interpretable Models and Effects based on Supervised Partitioning (LIME-SUP) techniques on a plurality of machine learning models, comprising at least one machine learning model with opacity issues that include a black box effect, to create a replicated semi-additive index data structure that provides local and global explainability for the black box effect,
wherein the replicator communicates with a library of interpretable machine learning models, wherein the created replicated semi-additive index data structure is a neural network based formulation of an additive index model where a neural network of the neural network based formulation is a replicated structured neural network that is trained using mini-batch gradient-based methods, and wherein the black box effect is a non-visible operation, of the at least one machine learning model with the opacity issues, that lacks explainability; and generate a score and a plurality of sub-scores based on the created replicated semi-additive index data structure, wherein generating the score involves ranking a relative effect of a disparity to a plurality of elements of the created replicated semi-additive index data structure, wherein the ranking comprises ranking relative importance of a decomposed effect of the disparity, wherein the score is indicative of a match status to the at least one machine learning model with the opacity issues; and render selected characteristics of the created replicated semi-additive index data structure to produce a rendering that depicts the local and global explainability for the black box effect of the at least one machine learning model with the opacity issues.

16. The non-transitory computer readable medium of claim 15, wherein:

the rendering comprises at least one of an ICE, CICE, or Normalized CICE plot, the at least one of the ICE, CICE, or Normalized CICE plot provides a diagnostic for observed values of the at least one machine learning model with the opacity issues that provides a simplification for data oversize, in an instance where the rendering comprises the CICE plot, the diagnostic provided for the observed values comprises a total sensitivity of a variable $X_i$, and in an instance where the rendering comprises the Normalized CICE plot, the diagnostic provided for the observed values comprises an interaction sensitivity for the variable $X_i$.

17. The non-transitory computer readable medium of claim 15, wherein the rendering comprises:

an ATDEV matrix plot that provides, for off-diagonal non-null sets, dependence of corresponding variables and non-zero effects of a fitted response to the at least one machine learning model with the opacity issues; and an overlay of an ATDEV one dimensional plot that is generated from columns of the ATDEV matrix plot with a one-dimensional marginal plot, wherein diagnostics for the ATDEV matrix plot is configured to confirm estimation accuracy.

18. The non-transitory computer readable medium of claim 17, wherein the rendering further comprises:

an ATDEV component heat map and correlation heat map that compensate for a large dimension of one or more predictors related to the at least one machine learning model with the opacity issues, wherein the ATDEV component heat map and the correlation heat map provide a measure of importance of a corresponding effect on the fitted response related to the at least one machine learning model with the opacity issues; and wherein the ATDEV component heat map comprises a simplification of the ATDEV matrix plot, and the correlation heat map provides a measure of Pearson correlations between a plurality of sets of predictor pairs related to the at least one machine learning model with the opacity issues.

19. The non-transitory computer readable medium of claim 15, wherein the rendering comprises:

a centered overlay of PDP, ALE, and marginal plots that provides a plurality of variable to variable correlation effects, wherein a subset of the plurality of variable to variable correlation effects provides indication that a selected variable's model contribution is additive and another subset of the plurality of variable to variable correlation effects provides indicia of a level of extrapolation effects.

* * * * *